US012775637B2

(12) United States Patent
Reddy Gari et al.

(10) Patent No.: US 12,775,637 B2
(45) Date of Patent: Oct. 27, 2026

(54) META MACHINE DATA-CENTRIC DATA PIPELINE

(71) Applicant: GE Precision Healthcare LLC, Waukesha, WI (US)

(72) Inventors: Rama Krishna Reddy Narayana Reddy Gari, Brookfield, WI (US); Mathews Matson Chavarukattil, Bangalore (IN); Sridhar Madhavan, Barrington, IL (US); Thomas Haworth, Sussex, WI (US)

(73) Assignee: GE Precision Healthcare LLC, Waukesha, WI (US)

( * ) Notice: Subject to any disclaimer, the term of this patent is extended or adjusted under 35 U.S.C. 154(b) by 153 days.

(21) Appl. No.: 18/628,382

(22) Filed: Apr. 5, 2024

(65) Prior Publication Data

US 2025/0315446 A1 Oct. 9, 2025

(51) Int. Cl.
*G06F 16/28* (2019.01)
*G06F 16/25* (2019.01)

(52) U.S. Cl.
CPC .......... *G06F 16/283* (2019.01); *G06F 16/252* (2019.01); *G06F 16/258* (2019.01)

(58) Field of Classification Search
CPC ..... G06F 16/252; G06F 16/258; G06F 16/283
See application file for complete search history.

(56) References Cited

U.S. PATENT DOCUMENTS 7,949,444 B2 5/2011 Mukherjee
8,055,887 B2 11/2011 Karstens
8,407,158 B2 3/2013 Suri et al.
8,738,663 B2 5/2014 Gonzalez et al.
8,746,548 B2 6/2014 Terwilliger et al.
9,183,603 B2 11/2015 Borges et al.
(Continued)

FOREIGN PATENT DOCUMENTS

CN 105913355 A 8/2016
CN 108231145 A 6/2018
(Continued)

OTHER PUBLICATIONS

Non-Final office action received for U.S. Appl. No. 18/422,591 dated Dec. 20, 2024, 42 pages.
(Continued)

*Primary Examiner* — Sherief Badawi
*Assistant Examiner* — J Mitchell Curran

(57) ABSTRACT

An architecture and techniques are presented for defining and generating meta machine data, which can enable use of the meta machine data to control or improve machine data pipeline operations. Input from existing security or privacy documents or other documents or modalities can be used to determine a format of the meta machine data. For example, the meta machine data can comprise a data pipeline configuration data structure configured to store configuration information of a data pipeline that communicates the machine data, a data quality metrics data structure configured to store data quality information of a consuming application that consumes the machine data, and a data governance data structure configured to indicate administrative governance information with respect to the machine data.

17 Claims, 12 Drawing Sheets

(56) References Cited

U.S. PATENT DOCUMENTS

| | | | |
|---|---|---|---|
| 9,396,037 B2 | 7/2016 | Morsi et al. | |
| 9,536,044 B2 | 1/2017 | White et al. | |
| 9,672,458 B2 | 6/2017 | Burkhart et al. | |
| 9,734,448 B2 | 8/2017 | Bolich et al. | |
| 10,025,791 B2 | 7/2018 | Lee | |
| 10,402,781 B2 | 9/2019 | Terwilliger et al. | |
| 10,638,999 B2 | 5/2020 | Shah | |
| 10,789,264 B2 | 9/2020 | Crabtree et al. | |
| 10,810,390 B2 | 10/2020 | Hegendoerfer et al. | |
| 10,901,834 B2 | 1/2021 | Abhinav et al. | |
| 10,902,232 B2 | 1/2021 | Peng | |
| 10,949,440 B2 | 3/2021 | Schoueri et al. | |
| 11,087,878 B2 | 8/2021 | Vesto et al. | |
| 11,126,635 B2 * | 9/2021 | Behzadi | G06F 16/288 |
| 11,240,181 B1 | 2/2022 | Nagaraja et al. | |
| 11,309,060 B2 | 4/2022 | Janevski et al. | |
| 11,321,338 B2 * | 5/2022 | Okorafor | G06F 16/258 |
| 11,327,989 B2 | 5/2022 | Wu et al. | |
| 11,481,738 B2 | 10/2022 | Tong et al. | |
| 11,599,729 B2 | 3/2023 | Wu | |
| 11,842,188 B2 | 12/2023 | Bregman et al. | |
| 2010/0274750 A1 | 10/2010 | Oltean et al. | |
| 2013/0087609 A1 | 4/2013 | Nichol et al. | |
| 2015/0302176 A1 | 10/2015 | Lyons et al. | |
| 2019/0019090 A1 | 1/2019 | Chacko et al. | |
| 2019/0370671 A1 | 12/2019 | Canedo et al. | |
| 2020/0365262 A1 | 11/2020 | Sreenivasan et al. | |
| 2020/0380076 A1 | 12/2020 | Taylor | |
| 2021/0064932 A1 | 3/2021 | Wang et al. | |
| 2021/0117437 A1 * | 4/2021 | Gibson | G06F 16/258 |
| 2021/0241897 A1 | 8/2021 | Casse et al. | |
| 2022/0005083 A1 | 1/2022 | Patterson et al. | |
| 2022/0189618 A1 | 6/2022 | Klassen et al. | |
| 2022/0293246 A1 | 9/2022 | Tweedie et al. | |
| 2022/0374300 A1 | 11/2022 | Che et al. | |
| 2023/0034748 A1 | 2/2023 | Bull et al. | |
| 2023/0168895 A1 | 6/2023 | Shah et al. | |
| 2023/0238103 A1 | 7/2023 | Murphy et al. | |
| 2023/0259821 A1 | 8/2023 | Travalini et al. | |
| 2023/0335236 A1 | 10/2023 | Dambman et al. | |
| 2023/0335238 A1 | 10/2023 | Danckwardt | |
| 2023/0393832 A1 | 12/2023 | Touati | |
| 2024/0296352 A1 | 9/2024 | Yanosy et al. | |
| 2024/0386074 A1 * | 11/2024 | Ressler | G06F 17/18 |
| 2025/0225328 A1 * | 7/2025 | Chowdhury | G06F 40/30 |

FOREIGN PATENT DOCUMENTS

| | | | | |
|---|---|---|---|---|
| CN | 110035303 A | | 7/2019 | |
| CN | 111899852 A | | 11/2020 | |
| CN | 112364148 A | | 2/2021 | |
| CN | 114118062 A | | 3/2022 | |
| CN | 112732934 B | | 5/2022 | |
| CN | 114882979 A | | 8/2022 | |
| CN | 114898848 A | | 8/2022 | |
| CN | 115098673 A | | 9/2022 | |
| CN | 115964460 A | | 4/2023 | |
| CN | 114446423 B | | 6/2023 | |
| EP | 3913496 A1 | * | 11/2021 | G06F 16/283 |
| WO | 2020/167316 A1 | | 8/2020 | |
| WO | 2022/229088 A1 | | 11/2022 | |
| WO | 2023/088983 A1 | | 5/2023 | |

OTHER PUBLICATIONS

EP application 25164420.9 filed Mar. 18, 2025—extended Search Report issued Jul. 4, 2025; 14 pages.

Deloitte, "Tech Trends 2021", Delotte Insights, https://www2.deloitte.com/content/dam/insights/articles/7023_TT-machine-data-revolution-feeding-the-machine/DI_2021-TT-machine-data-revolution.pdf, last accessed Nov. 2, 2023, 21 pages.

Anadiotis, George, "5 Technology Trends for the Roaring 20s, Part 2: AI, Knowledge Graphs, Infinity and Beyond", On-line publication on ZD Net, https://www.zdnet.com/article/5-technology-trends-for-the-roaring-20s-part-2-ai-knowledge-graphs-infinity-and-beyond/, Jan. 16, 2020, 9 pages.

Mcmahan et al., "Federated Learning: Collaborative Machine Learning without Centralized Training Data", Google Blog, https://ai.googleblog.com/2017/04/federated-learning-collaborative.html, Apr. 6, 2017, 5 pages.

Tensorflow, "TensorFlow Federated: Machine Learning on Decentralized Data", Online Available at URL: https://www.tensorflow.org/federated, last accessed Aug. 28, 2023, 4 pages.

schema.org, Company website https://schema.org/, last accessed Aug. 28, 2023, 1 page.

schema.org, "IoT and Schema.org: Getting Started", https://schema.org/docs/iot-gettingstarted.html, last accessed Sep. 19, 2023, 15 pages.

Chavarukattil, et al. "Generative Artificial Intelligence Driven Self-Healing Agent for Medical Devices" U.S. Appl. No. 18/749,679, filed Jun. 21, 2024, 37 pages.

Maguire et al., "A Metadata-Based Architecture for User-Centered Data Accountability", Electron Markets, Online available at <https://link.springer.com/article/10.1007/s12525-015-0184-z>, vol. 25, 2015, pp. 155-160.

* cited by examiner

META MACHINE DATA-CENTRIC DATA PIPELINE

TECHNICAL FIELD

This disclosure relates generally to generating meta machine data according to a defined format that can be leveraged for a variety of purposes, including improving machine data pipeline architecture or operation, improving a DevOps pipeline architecture or operation, and improving telemetry for associated devices or systems.

BACKGROUND

Certain machines or devices that are equipped to communicate do so by generating and transmitting data, referred to herein as machine data. For example, a given device may periodically transmit machine data via a machine data pipeline. This machine data can include sensor data, usage data, system event data, or operational data, which can be provided to a data warehouse where that data can be examined or utilized for a variety of purposes such as troubleshooting, diagnostics, remote maintenance or planning, and so on. The machine data can be specific to the device as a whole, may be specific to a subsystem or component of the device, or may relate to an associated device.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with a non-limiting, example implementation, a system can include a meta machine data capture component. The meta machine data capture component can receive input data and store, to a metadata repository, meta machine data indicative of a context for machine data. The system can further comprise a meta machine data generation component. The meta machine data generation component can generation the meta machine data according to a format that is determined based on the input data. The meta machine data that is generated according to the format can comprise various different data structures with designated purpose or function. For example, the meta machine data can comprise, a data pipeline configuration data structure configured to store configuration information of a data pipeline that communicates the machine data, a data quality metrics data structure configured to store data quality information of a consuming application that consumes the machine data, and a data governance data structure configured to indicate administrative governance information with respect to the machine data.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
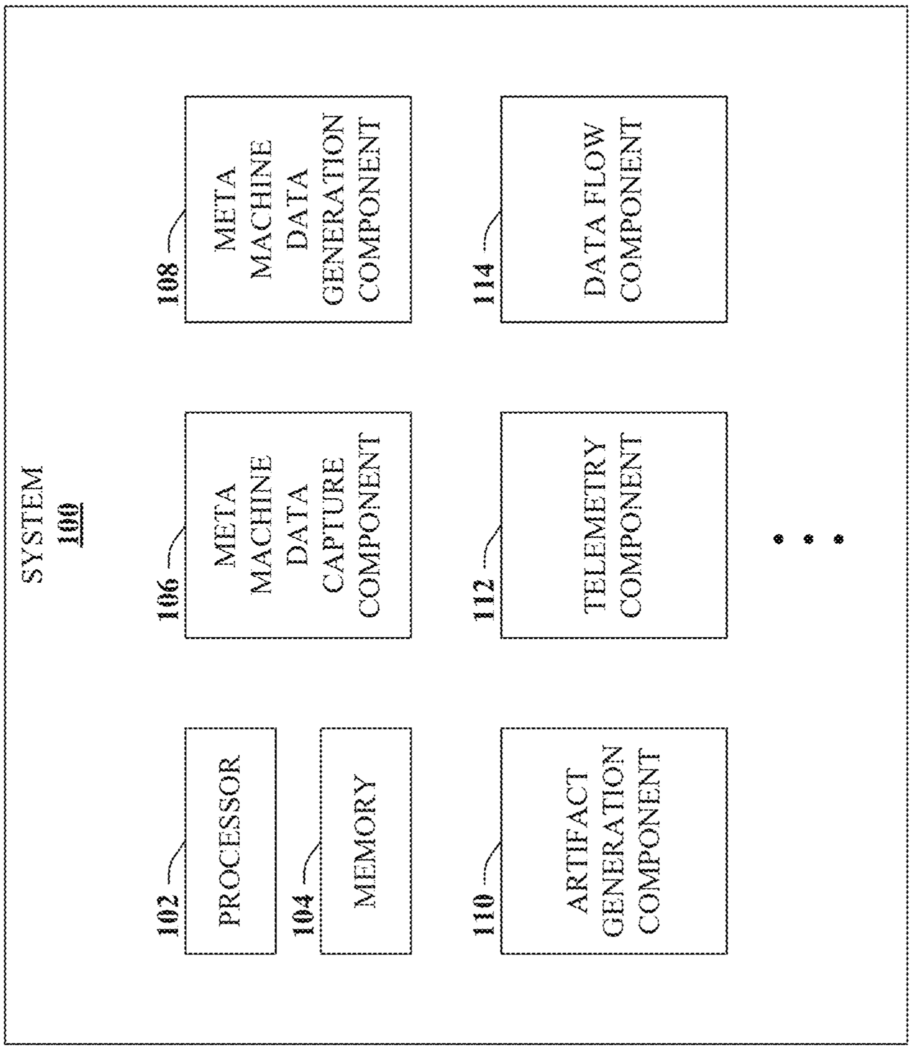
FIG. 1 illustrates a schematic block diagram is presented of an example system that can define and generate meta machine data and utilize the meta machine data to control or improve pipeline operations in accordance with certain embodiments of this disclosure.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure might be practiced without these specific details, or with other methods, components, materials, etc. In other instances, well-known structures and devices are shown in block diagram form to facilitate describing one or more aspects.

As noted in the Background section, machine data, generated by a device or machine, can include sensor data, usage data, system event data, operational data, or the like. Typically, this machine data is transmitted to a data warehouse, backoffice site, or other backend storage system, where it can be examined. For example, machine data can be instrumental for servicing the device or machine (e.g., a computed tomography (CT) machine) or a subsystem or portion of the device or machine (e.g., an x-ray tube of the CT machine). For instance, by examining the machine data from the CT machine, troubleshooting, diagnostics, remote maintenance or planning, and so forth can be performed. Hence, in certain domains, machine data can be important for generating accurate business insights.

While machine data can be a key asset for certain organization, metadata can be of similar importance. Generally, metadata describes a context of the underlying data, which can give insights in how to properly use the underlying data. While data can represent a key asset, without associated metadata, much of the value of the data can be lost or go unrealized. The value or utility of data to an organization can be a function of the quality of associated metadata, as richer, high-quality metadata tends to correlate with improved data quality and data consumption. As used herein, the terminology 'meta machine data' is in some embodiments intended to refer metadata that is specific to machine data. Currently, most organizations do not have processes to capture and use meta machine data in a manner sufficient for enabling consuming application (e.g., artificial intelligence (AI) or machine learning (ML)) models to generate accurate outcomes.

The disclosed subject matter is, in some embodiments, directed to defining and generating high-quality meta machine data for the underlying machine data. In some embodiments, the format of the meta machine data can be leveraged by a machine data pipeline architecture and processes for capturing or generating the meta machine data as well as using the meta machine data, potentially along with AI models to solve various data engineering challenges that organizations face today. The disclosed techniques can define the structure or format of the meta machine data and how to protect machine data or meta machine data. This structure or format can be determined by leveraging existing privacy and security documents, data quality documents, or the like. Generating the meta machine data according to the format can represent a significant technical improvement for pipeline architecture. For example, the disclosed techniques detail ways in which the meta machine data can be used for governance, software development and operations (DevOps), process automation, and scalable deployment into various pipeline (e.g., machine data pipelines, DevOps pipelines, . . . ) configurations, also potentially leveraging advances in AI and associated models.

Referring initially to FIG. 1, a schematic block diagram is presented of a system 100 that can define and generate meta machine data and utilize the meta machine data to control or improve pipeline operations in accordance with certain embodiments of this disclosure. System 100 can comprise a processor 102 that can be specifically configured to define or generate meta machine data and/or to leverage the meta machine data to control pipeline operations, application development, or the generation or consumption of the meta machine data. System 100 can also comprise memory 104 that stores executable instructions that, when executed by processor 102, can facilitate performance of operations. Processor 102 can be a hardware processor having structural elements known to exist in connection with processing units or circuits, with various operations of processor 102 being represented by functional elements shown in the drawings herein that can require special-purpose instructions, for example, stored in memory 104. Along with these special-purpose instructions, processor 102 can be a special-purpose device. Further examples of the memory 104 and processor 102 can be found with reference to FIG. 11, which describes a computer 1112 comprising a processing unit 1114 and certain system memory 1116. It is to be appreciated that system 100 or computer 1112 can represent a server device of a communications network and can be used in connection with implementing one or more of the systems, devices, or components shown and described in connection with FIG. 1 and other figures disclosed herein.

Additionally, system 100 can comprise various other components that can facilitate the disclosed techniques. These can include meta machine data capture component 106, meta machine data generation component 108, artifact generation component 110, telemetry component 112, data flow component 114, or any other suitable component.

By way of introduction, meta machine data capture component 106 can be configured to receive input data and store meta machine data to a metadata repository. Meta machine data generation component 108 can be configured to generate the meta machine data according to a format that is determined based on the input data received by meta machine data capture component 106. Artifact generation component 110 can be configured to generate a group of artifacts based on the meta machine data. By way of example, the group of artifacts can comprise a document, a portion of code, or a configuration that is used by a development and operations pipeline. Telemetry component 112 can be configured to generate a telemetry bundle that comprises some portion or subset of the artifacts generated by artifact generation component 110. Telemetry component 112 can further transmit the telemetry bundle to a configurable device, which can then be configured according to the telemetry bundle. Data flow component 114 can determine an optimization that modifies a data flow of machine data being delivered to the data warehouse (e.g., via a machine data pipeline). Determining the optimization can be in response to examining the meta machine data and/or a state of the configurable device.

It is appreciated that while system 100 depicts a large group of components 106-114, other embodiments or systems may have only a portion of the disclosed components 106-114 or different subsets of the disclosed components 106-114 based on implementation. For example, systems 200, 500, and 800 detail distinct embodiments, each of which leverage different subsets of the group of components 106-114 shown in FIG. 1 for different purposes. Hence, system 100 can operate according to any combination of systems 200, 500, and 800, or any combination of the described components 106-114, or other components. In that regard, additional detail related to meta machine data capture component 106 and meta machine data generation component 108 can be found with respect to FIGS. 2-4. Additional detail related to artifact generation component

Figure 5:
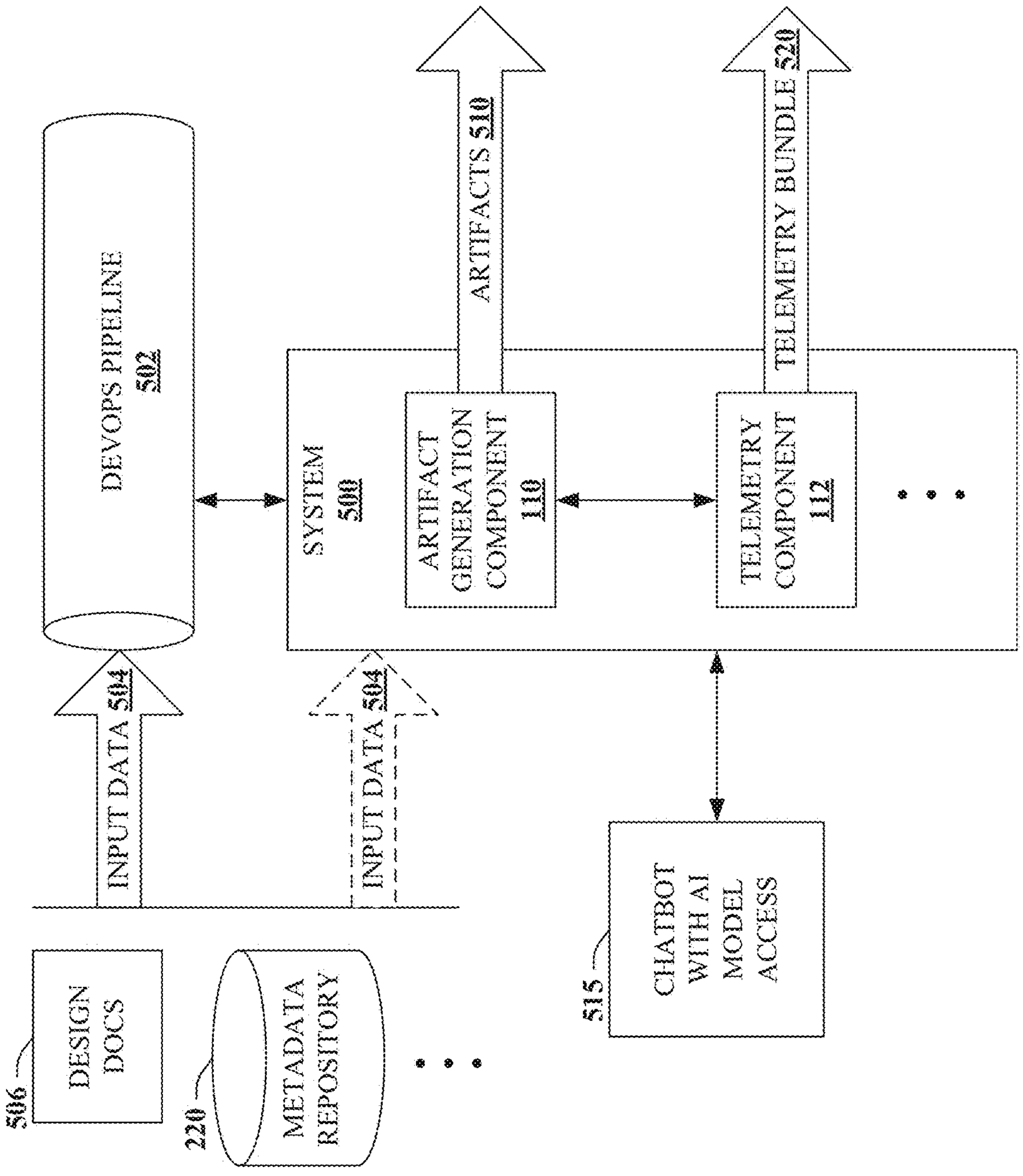
FIG. 5 depicts an example schematic block diagram illustrating a system that can leverage the meta machine data for the generation of artifacts and telemetry bundles in accordance with certain embodiments of this disclosure.
Figure 6A:
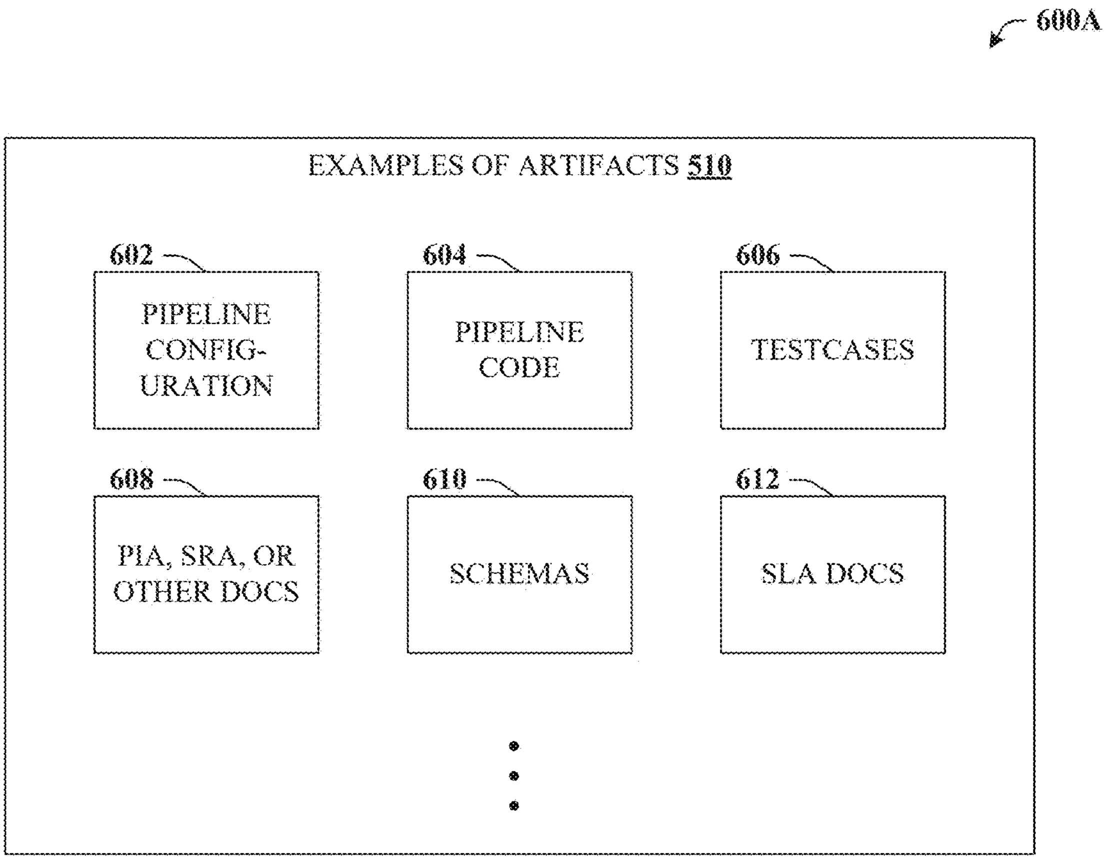
FIG. 6A is an example schematic block diagram illustrating various examples of the group of artifacts in accordance with certain embodiments of this disclosure.
Figure 6B:
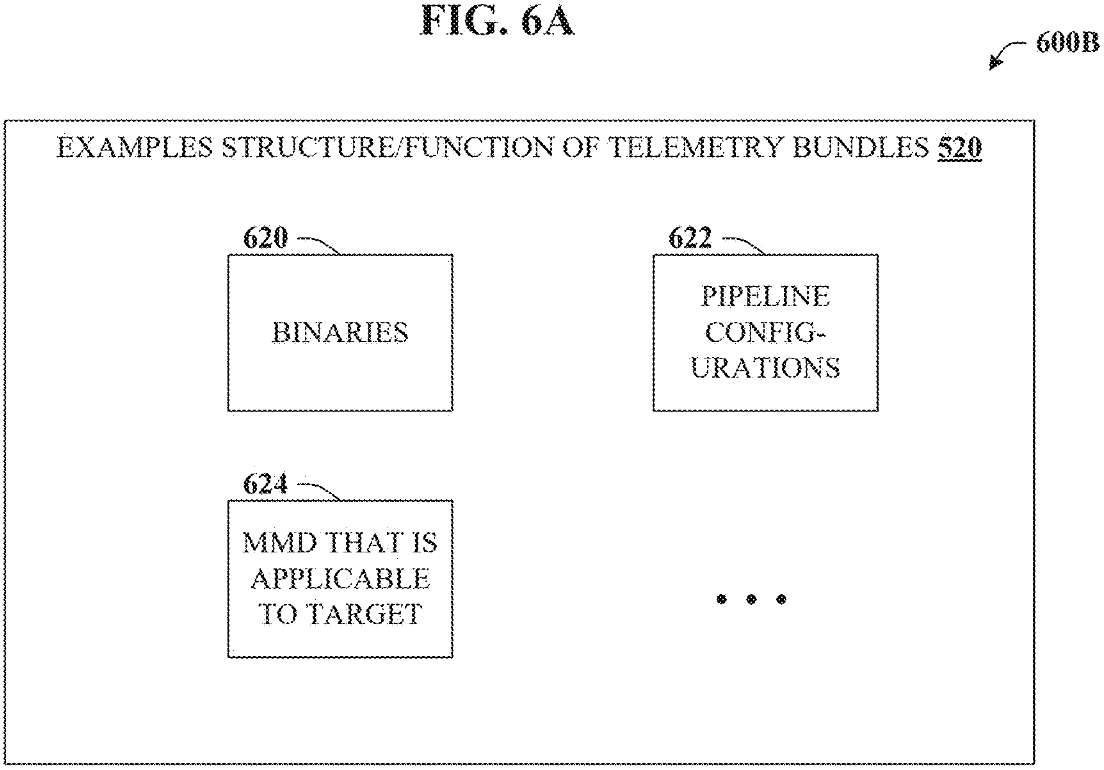
FIG. 6B is an example schematic block diagram illustrating various examples of the structure or function of a given the telemetry bundle in accordance with certain embodiments of this disclosure.
Figure 7:
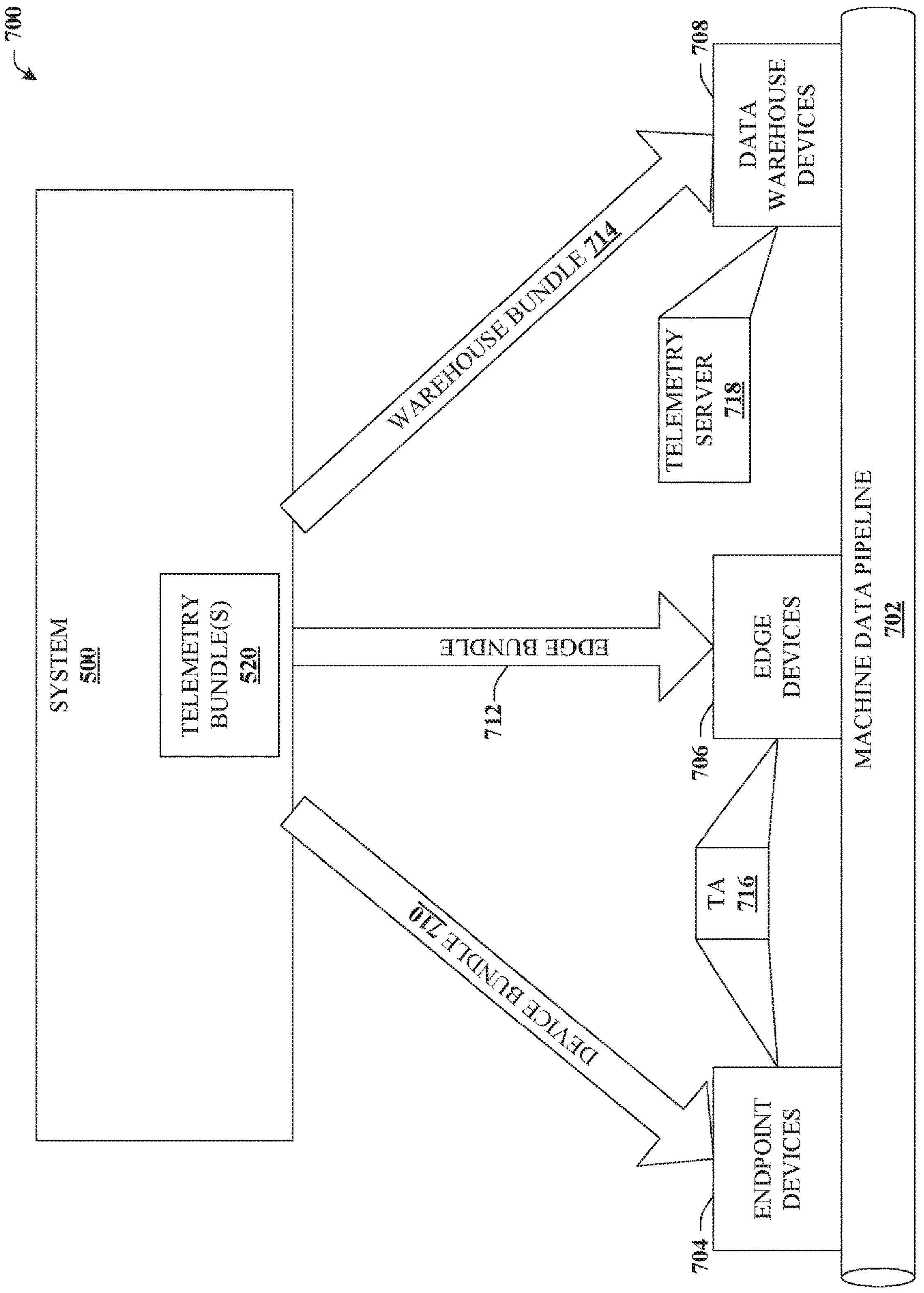
FIG. 7 depicts an example schematic block diagram illustrating additional aspects or elements of system 500 that can generate the telemetry bundle in accordance with certain embodiments of this disclosure.

110 and telemetry component 112 can be found with respect to FIGS. 5-7. Additional detail related to data flow component 114 can be found with respect to FIG. 8.

As noted, the disclosed techniques can operate to improve the quality of both machine data and meta machine data. With improved quality for both machine data and meta machine data, more accurate diagnostics can be achieved. For example, more accurate insights into the operation of devices or machines can be used to prevent unplanned downtime for the devices or machines. Furthermore, providing a scalable data pipeline architecture can allow faster development and deployment of pipeline operations for the diagnostic and insight generation elements. Such can operate to significantly improve customer productivity and customer experiences.

Today, no such scalable solution exists in which a shift-left strategy has been applied to effectively capture meta machine data, leverage the meta machine data, potentially along with AI models, as a foundation and basis for a wide range of improvements to an organization's operations. These improvements can include, for example, improved machine data pipeline architecture and design, improved data quality and metrics, improved DevOps pipeline development process and methodology, improved privacy review/approval processes and controls including software compliance, improved documentation, improved DevOps and testing automation, improved security such as IP security, access control, or cyber security, improved insight generation and machine data flow controls, and so on.

These and other benefits will become apparent with reference to the remainder of this disclosure. The remainder of this disclosure includes detailed description for each of the group of components 106-114 depicted by FIG. 1, as well as other suitable components that can exist.

Figure 2:
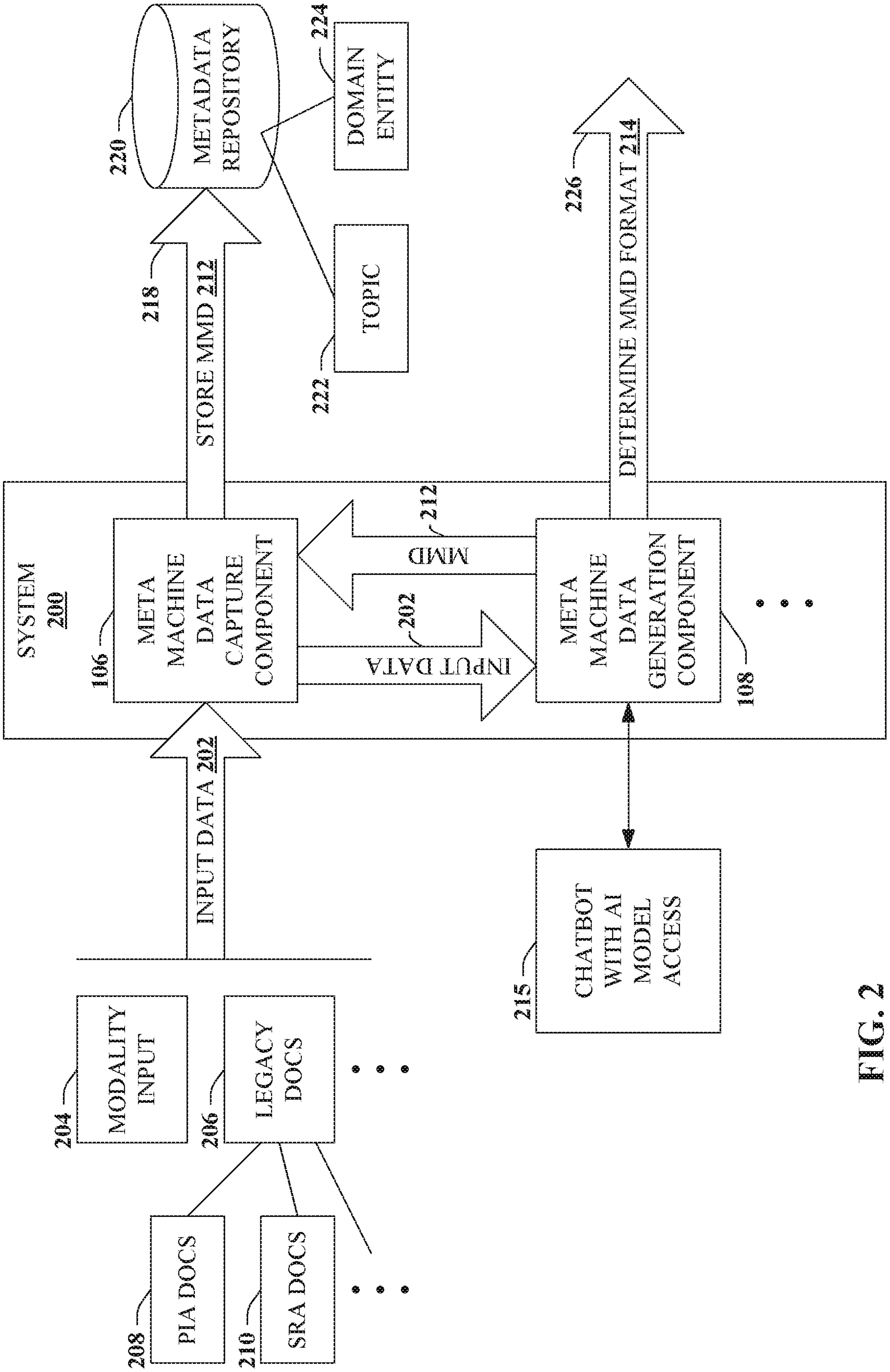
FIG. 2 depicts a schematic block diagram illustrating an example system that can facilitate determining a structure or format for meta machine data and generation of meta machine data according to the determined format in accordance with certain embodiments of this disclosure.

Referring now to FIG. 2, a schematic block diagram is depicted illustrating an example system 200 that can facilitate determining a structure or format for meta machine data and generation of meta machine data according to the determined format in accordance with certain embodiments of this disclosure. As illustrated, system 200 can comprise meta machine data capture component 106, meta machine data generation component 108, as well as other suitable components introduced in system 100 of FIG. 1, or otherwise.

Meta machine data capture component 106 can be configured to receive input data 202 and, as illustrated at reference numeral 218, to subsequently store meta machine data (MMD) 212 to metadata repository 220. Metadata repository 220 can in some embodiments be specifically configured to store meta machine data 212. Broadly, meta machine data 212 can be indicative of a context for machine data. In more detail, in some embodiments, meta machine data 212 can represent structured information that describes, explains, locates, or otherwise provides more efficient retrieval, use, or management of machine data. The context provided by meta machine data 212 can operate to make the underlying machine data more valuable, useful, or productive.

In that regard, meta machine data 212 can be specific to, and/or classified or stored according to a particular topic 222 and/or a particular domain entity 224, either or both of which can facilitate the use of knowledge graphs for a better understanding of meta machine data 212 or relationships between meta machine data 212 due, e.g., to an associated topic 222 or domain entity 224.

Generally, a domain entity 224 can be indicative of a device, system, subsystem, or another entity such as a table, process, or other construct of a device or system. For example, an x-ray tube of a CT device can represent a domain entity 224, as can the CT device, with the x-ray tube being a subsystem of the CT device. Topic 222 can be indicative of a machine data topic and can represent a physical quantity or a snapshot of state information relating to a specified domain entity 224 or an associated environment. By way of example, topic 222 can be, e.g., a temperature associated with an x-ray tube or an associated environment, an orientation of the CT device, and so on. In some embodiments, topic 222 can reflect time-series data that can indicate physical quantities or state information over time.

Meta machine data generation component 108 can be configured to receive input data 202, either directly or via meta machine data capture component 106 as shown in this example. In some embodiments, input data 202 can comprise or represent information obtained via modality input 204 or from legacy documents 206. Modality input 204 can be indicative of input from a human-machine interface. For instance, modality input 204 can be input by a human actor such as a modality engineer or another suitable entity.

Legacy documents 206 can represent or be indicative of any suitable data quality record or document. Representative examples can include a privacy impact assessment (PIA) document 208, a security risk assessment (SRA) document 210, or another suitable document. Legacy documents 206 or other input data 202 can be scanned or parsed by meta machine data generation component 108. In response, as indicated at reference numeral 226, meta machine data generation component 108 can determine a structure or format 214 for meta machine data 212. More specifically, meta machine data generation component 108 can determine the structure or format 214 for meta machine data 212 based on input data 202. Thereafter, meta machine data generation component 108 can be configured to generate meta machine data 212 according to format 214, which can be provided to metadata repository 220.

It is appreciated that generating meta machine data 212 according to format 214 can represent a significant technological advantage because such can allow the meta machine data 212 to be a foundation and basis for a wide range of improvements to an organization's operations. These improvements can include, for example, improved machine data pipeline architecture and design, improved data quality and metrics, improved DevOps pipeline development process and methodology, improved privacy review/approval processes and controls including software compliance, improved documentation, improved DevOps and testing automation, improved security such as IP security, access control, or cyber security, improved insight generation and machine data flow controls, and so on.

It is further appreciated that storing meta machine data 212 according to topic 222 or domain entity 224 can be a significant technological improvement, as foundational meta machine data 212 can be grouped or clustered in an efficient manner. For example, meta machine data 212 can be stored to metadata repository 220 according to a key for topic 222 and/or a key for domain entity 224.

In some embodiments, format 214 can be determined and/or meta machine data 212 can be generated with the aid of chatbot 215. Chatbot 215 can access to AI models that are trained for the particular objective. In some embodiments, chatbot 215 can be accessed by meta machine data generation component 108, as shown, while in other embodiments, chatbot 215 can be included in meta machine data generation component 108.

To provide additional detail, a chatbot (e.g., chatbot 215) can be a software program or artificial intelligence system designed to simulate the behavior of a human actor, typically through text or voice interactions. Chatbots can be used in various applications and environments to automate tasks, provide information, answer questions, or assist users in completing specific tasks.

Generally, chatbots can be classified into two main types based on functionality. They two types are rule-based chatbots and AI-powered chatbots. Rule-based chatbots operate according to predefined rules and responses. They follow a set of programmed rules to interpret user input and provide predetermined responses. Rule-based chatbots are often used for simple tasks and have limited capabilities in understanding certain elements such as natural language.

AI-powered chatbots utilize artificial intelligence and natural language processing (NLP) technologies to understand and respond to user input in a more human-like manner. These chatbots can analyze and interpret user queries, learn from interactions, and adapt their responses over time to provide more personalized and contextually relevant assistance. Chatbot 215 can be an example of an AI-powered chatbot in some embodiments.

Figure 3:
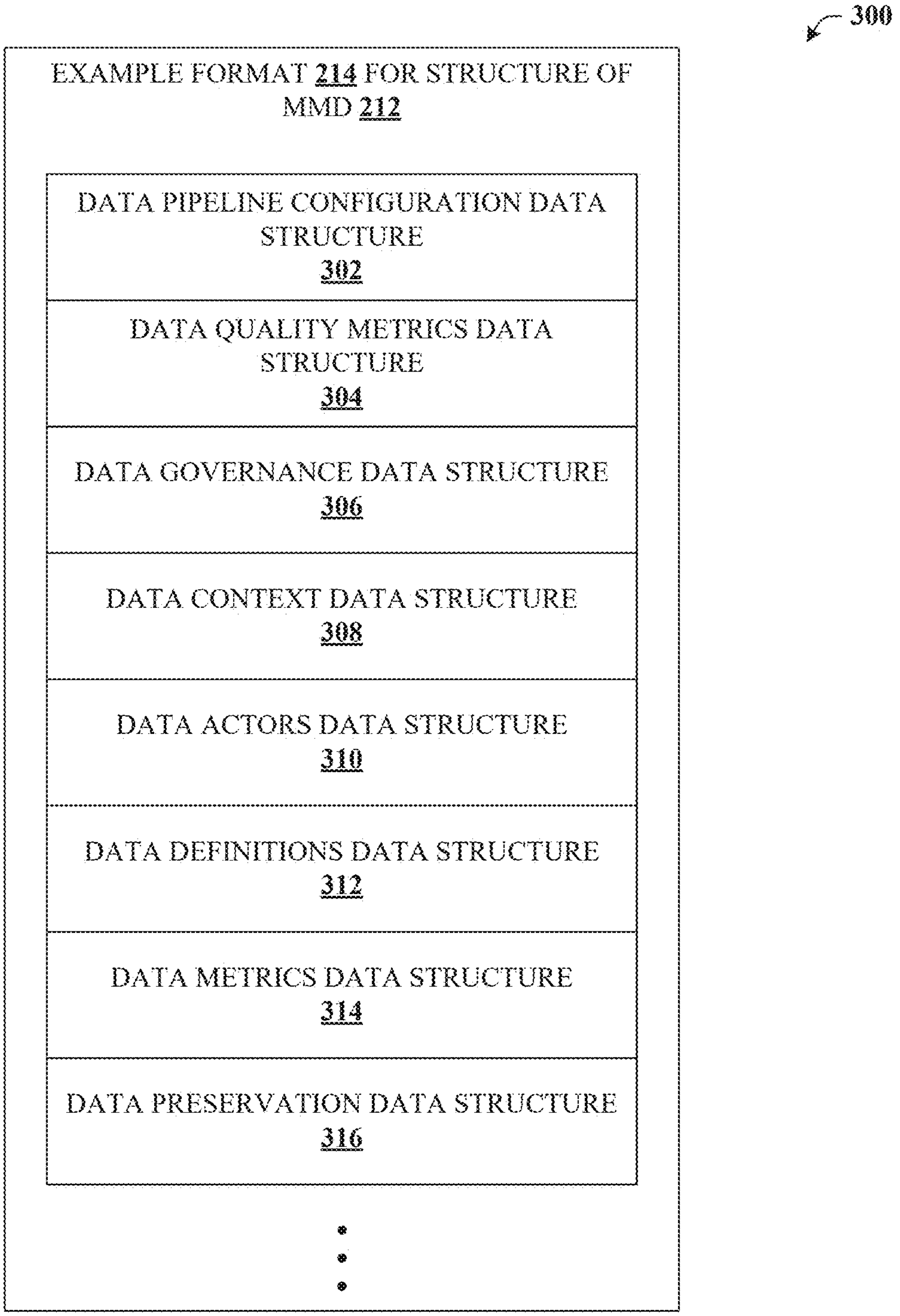
FIG. 3 depicts an example schematic block diagram illustrating an example format of the meta machine data in accordance with certain embodiments of this disclosure.

Chatbots can be deployed across various platforms and communication channels, including websites, messaging apps, social media platforms, and voice assistants. They are used in customer service, sales, marketing, support, and other domains to enhance user experience, improve efficiency, and automate routine tasks. In the present example, chatbot 215 can, utilizing appropriate AI models, to aid in the creation of format 214 and/or in the creation of meta machine data 212. Format 214 can be a key component of the entire meta machine data and/or machine data ecosystems and can be leveraged to perform operations that greatly improve those ecosystems. FIG. 3 illustrates an example of format 214, illustrating example structural elements of meta machine data 212 that is defined by format 214.

Turning now to FIG. 3, an example schematic block diagram 300 is depicted illustrating an example format 214 of meta machine data 212 in accordance with certain embodiments of this disclosure. It is appreciated that format 214 can include all or a portion of data structures defined or described herein. It is further appreciated that format 214 can be determined as a function of input 202 and therefore can vary based on input 202.

In some embodiments, meta machine data 212 can comprise (e.g., as defined by format 214) data pipeline configuration data structure 302. Data pipeline configuration data structure 302 can be configured to store configuration information of a machine data pipeline that communicates the machine data. For example, data pipeline configuration data structure 302 can indicate various function of the data pipeline for a given machine data class or topic (e.g., topic 222). Hence, the configuration information indicated by data pipeline configuration data structure 302 can comprise elements such as pipeline input data that describes an input to the data pipeline, pipeline processing data that describes processing that the data pipeline performs, pipeline storage data that describes data that is stored by the data pipeline, pipeline output data that describes an output of the data pipeline, and so on.

In more detail, pipeline input data can describe an input to the data pipeline such as indications of a source of the machine data or other input, a format of the machine data or other input, a volume of the machine data or other input, a velocity of the machine data or other input and so forth. Pipeline processing data can describe processing that the data pipeline performs, such as data aggregation or filtering. Pipeline storage data can describe machine data that is stored by the machine data pipeline. Pipeline output data can describe an output of the machine data pipeline such as, e.g., a destination for the machine data or other output, a format of the machine data or other output, a volume of the machine data or other output, a velocity of the machine data or other output, and so on.

Considering the previously discussed example of an x-ray tube of a CT device, example aspects of associated data pipeline configuration data structure 302 may be represented by the following example in some embodiments:

Inputs: Producer—temperature sensor
data source —/var/log/tube/temp_sensorl.csv
format—comma separated values
collection frequency—1 record/second
Processing: aggregation—10 records into 1 record
filter—PHI/PII data
pipeline data retention—1 month
storage format—json
Outputs: destination—Cloud URL
format—JSON
volume—10 KB/hour velocity—1 record/10 seconds Example code for data pipeline configuration data structure 302 can be as follows:

```
{
"data_pipeline_configuration": "{data_collector: {
  "input": {"source_type": "file",
    "source_config": {
      "path": "/var/log/messages",
      "encoding": "utf8"},
    "input_format": "custom",
    "source_format": {"parse": "/^(?<logtime>
      (\\d{4}-\\d{2}-\\d{2}T\\d{2}:\\
      d{2}:\\d{2}.\\d{6}\\+\\d{2}:\\d{2}*)) (?<host-
      name>([\\w]+)) (?<program>(([\\w&.\\-]+:|
      [\\w&.\\-]+\\[\\d*\\]:))) (?<message>((.*)))$/"}},
  "output": {"priority": "medium"},
  "mds":{"isMDSRequired": true,
    "dataRetention":100
  } } }
```

In some embodiments, meta machine data 212 can comprise data quality metrics data structure 304. Data quality metrics data structure 304 can be configured to store data quality information of a consuming application that consumes the machine data and/or meta machine data 212. Data quality information can be comprise, for example, app importance data that indicates a degree of importance of the machine data to the consuming application. Data quality information can also comprise volume data that can indicate a amount or velocity of the machine data that is expected to be consumed by the consuming application. In some embodiments, data quality information can comprise retention data that indicates a time to retain the machine data, loss data that indicates a data loss threshold for the machine data. Data quality information can also comprise latency data that indicates a time from collection of the machine data until the machine data is ready for consumption by the consuming application. Other examples of data quality information store in data quality metrics data structure 304 are contemplated.

In some embodiments, example aspects of data quality metrics data structure 304 may be represented by the following example:

Priority—High (e.g., availability for consuming application is indicated as important).

Input Volume—10 KB/hour; velocity—1 record/10 seconds.

Data Retention—3 months.

Data loss threshold—0.01%.

Data Latency—availability for application with in 5 seconds from collection.

Example code for data quality metrics data structure 304 can be as follows:

```
{
“data_quality_metrics”: {
  “collection_transfer_priority”: “<Critical/High/Medium/Low>”,
//determines frequency of collection & transfer to BO
  “estimated_volume”: “<x MB/day>”, ←need to add for
    device and back office
  “estimated_velocity”: “<x MB Per Minute>”,
  “retention_period”: “<x months>”,
  “data_loss_threshold”: “<X %>”
}
```

In some embodiments, meta machine data 212 can comprise data governance data structure 306. Data governance data structure 306 can be configured to indicate administrative governance information with respect to the machine data and/or meta machine data 212. The administrative governance information can comprise, for instance, stakeholder information indicative of a data owner identifier of the machine data, a data steward identifier of the machine data, a privacy reviewer identifier of the machine data, or a notifier identifier of the machine data. As used herein, a privacy reviewer can be an individual or other entity responsible for assessing and evaluating the privacy implications of systems or ecosystems detailed herein. Generally, a privacy reviewer conducts privacy reviews or assessments to ensure compliance with relevant privacy regulations, standards, and best practices.

In some embodiments, the administrative governance information can comprise policy information indicative of a policy that is applicable to the machine data. In some embodiments, the administrative governance information can comprise process information indicative of a process that is applicable to the machine data. Other examples are contemplated.

In some embodiments, example aspects of data governance data structure 306 may be represented by the following example:

Stakeholders—
data owner: john doe,
data steward: john steward,
Privacy reviewers:p_reviewer1, p_reviewer2,
Approvers: approver 1, approver 2,
Notifiers: notifier 1
Applicable policies & Processes—
Privacy Impact Assessment,
Service Level Agreement Example code for data governance data structure 306 can be as follows:

```
{
“data_governance” {“data_owner”: “John Doe”,
  “data_steward”: “John Steward”,
  “PIA_reviewers”: [“Amanda A”, “Christine C”, “P3”,
“P4”],
  “Stakeholders”: [“S1”, “S2”, “S3”, S4”]
}
```

In some embodiments, meta machine data 212 can comprise data context data structure 308. Data context data structure 308 can be configured to indicate a specific context of the machine data. This specific context of the machine data can comprise, for example, a name of a topic (e.g., topic 222) for the machine data, a type of the topic for the machine data, a description of the topic for the machine data, and a name or modality of a domain entity (e.g., domain entity 224) that generates the machine data. Other examples are contemplated.

Example code for data context data structure 308 can be as follows:

```
{
“topic_name”: “X-ray tube temp data”,
“uid”: “metadata_ID_1”,
“modality”: “CT”,
“topic_description”: “X-ray Tube Temperature”,
“topic type”: “sensor data”
}
```

In some embodiments, meta machine data 212 can comprise data actors data structure 310. Data actors data structure 310 can be configured to indicate provenance information of the machine data. This provenance information can comprise, e.g., a producer identifier of the machine data, a consumer identifier of the machine data, and/or a domain entity identifier that identifies a domain entity that generates the machine data. Other examples are contemplated.

Example code for data actors data structure 310 can be as follows:

```
{
“producers”: [“syslog_d_ct”, “syslog_d_mr”], //processes
  or services
“consumers”: [“HV_BAT”, “START”, “Rule
  Studio”], //application
“products”: [“Revolution CT”, “Revolution EVO”,
  “Signa XR”]
//products
}
```

In some embodiments, meta machine data 212 can comprise data definitions data structure 312. Data definitions data structure 312 can be configured to indicate structural information of the machine data and/or semantic information of the machine data. The structural information can indicate a schema utilized by the machine data or a data type associated with a data element of the machine data. The semantic information can indicate a relationship between at least two different data elements of the machine data. Other examples are contemplated.

Example code for data definitions data structure 312 can be as follows:

```
{
Schema {“TubeTempSchema“: {dateTime: {type:”
  String”},
temp: {“type”: “number”}}}
Model: http://catalog.healthcare.com/ct_models/syslog/
  v5
}
```

In some embodiments, meta machine data 212 can comprise data metrics data structure 314. Data metrics data structure 314 can be configured to indicate a range of suitable values for the machine data and/or a privacy classification of the machine data. Other examples are contemplated.

Example code for data metrics data structure 314 can be as follows:

```
{
“data_thresholds”: [{“field_name”: “tube_temperature”,
  “min”: 10,
“max”: 240}],
“data_privacy_classification”: [{“field_name”:
  “tube_temperature”,
```

"privacy_class": "NONE"}],
"data_ip_classification": [{"field_name": "tube_temperature",
"IP_class": "A"}]
}

In some embodiments, meta machine data 212 can comprise data preservation data structure 316. Data preservation data structure 316 can be configured to indicate processes or other aspects of safeguarding and/or maintaining data over time to ensure integrity, accessibility, or usability of the data (e.g., machine data) for future purposes. Data preservation data structure 316 can relate to strategies, policies, or procedures that can be implemented to protect from data loss, corruption, or obsolescence, and to ensure that the data remains available and usable for as long as it is needed. Other examples are contemplated.

Figure 4:
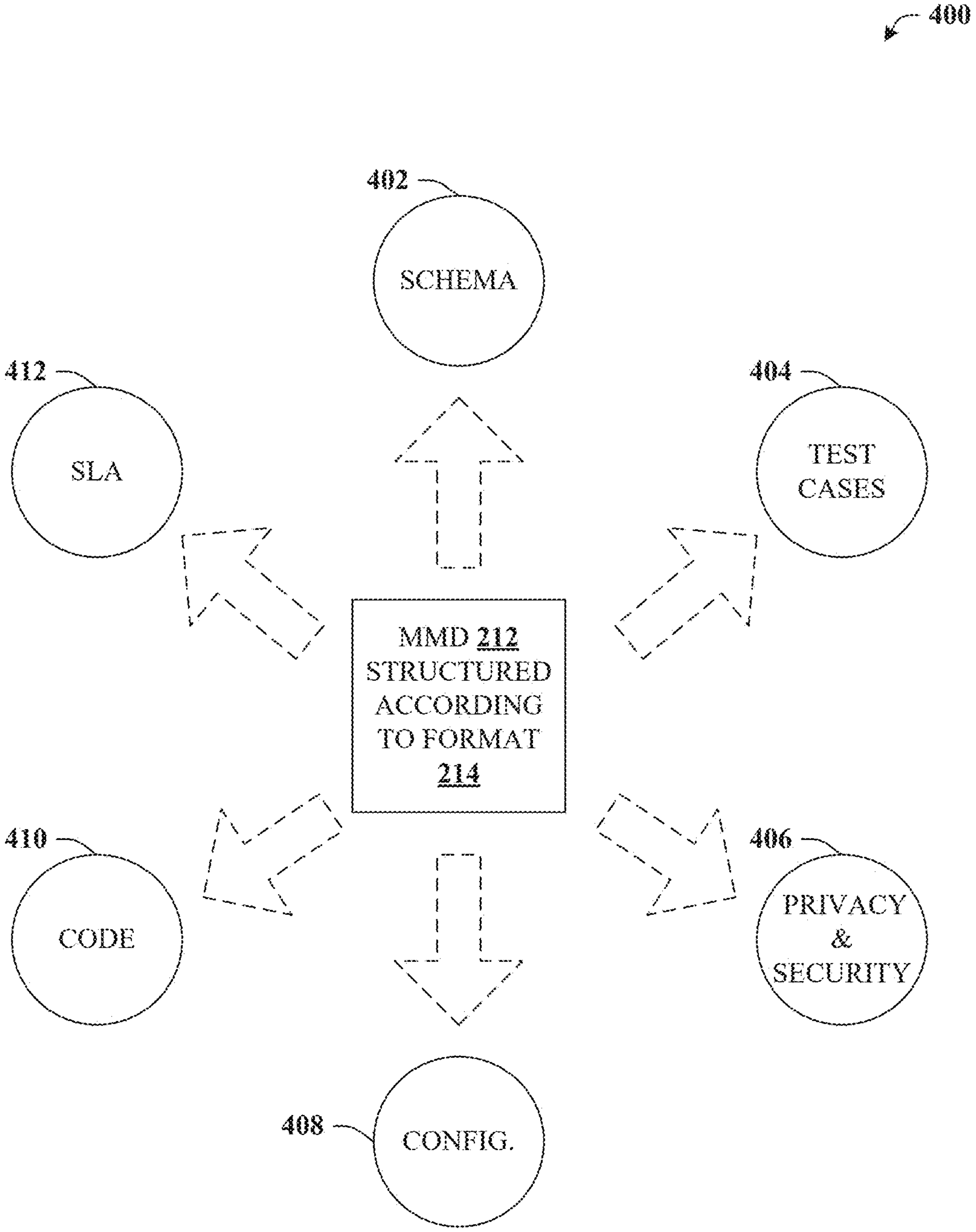
FIG. 4 depicts an example schematic block diagram illustrating example functions of the machine meta data that is generated according to the format in accordance with certain embodiments of this disclosure.

With reference now to FIG. 4, an example schematic block diagram 400 is depicted illustrating example functions of the machine meta data 212 that is generated according to format 214 in accordance with certain embodiments of this disclosure. One potential shortcoming of other systems is that metadata is often treated as tertiary. However, by designing the metadata (e.g., meta machine data 212) as a central focus and with a robustness that captures significant aspects of machine data and associated topics (e.g., topics 222), meta machine data 212 can become a foundation and basis for numerous functions of a business or organization.

For example, in some embodiments, meta machine data 212 that is structured according to format 214 can be leveraged to generate one or more schema 402. System 100 or an associated component (e.g., artifact generation component 110) can be utilized to generate schema 402 and to automatically publish said schema 402 to a catalog that can be viewed and searched.

Further, in some embodiments, meta machine data 212 that is structured according to format 214 can be leveraged to generate test cases 404. System 100 or an associated component can be utilized to generate any suitable test cases 404. Testcases 404 can include, for example, unit testcases, component and end-to-end integration testcases, or other suitable testcases.

In some embodiments, meta machine data 212 that is structured according to format 214 can be leveraged to generate privacy and security elements 406. System 100 or an associated component can be utilized to generate any suitable privacy and security elements 406. Privacy and security elements 406 can include, for example, PIA reports, privacy and security review documents, protection of data documents for data at rest or in transit, protection of IP data, and so on.

In some embodiments, meta machine data 212 that is structured according to format 214 can be leveraged to generate configuration elements 408. System 100 or an associated component can be utilized to generate any suitable configuration elements 408. Such can include data pipeline configurations, or other pipeline configurations (e.g., DevOps). Configuration elements 408 can be applicable to any suitable domain entity 224, including endpoint device (e.g., the CT device or an associated x-ray tube), edge devices (e.g., data pipeline infrastructure), or data warehouse devices (e.g., servers).

In some embodiments, meta machine data 212 that is structured according to format 214 can be leveraged to generate code elements 410. System 100 or an associated component can be utilized to generate any suitable code elements 410. Such can include parsing logic, transformation logic, validation logic, de-identification logic, filtering logic, and so forth. Code elements 410 can be applicable to any suitable device or domain entity 224, including endpoint devices, edge devices, or data warehouse devices.

In some embodiments, meta machine data 212 that is structured according to format 214 can be leveraged to generate service level agreement (SLA) elements 412. System 100 or an associated component can be utilized to generate any suitable SLA elements 412. Such can generation of an SLA document or review, data quality metrics documents, enforcement documents, and the like.

As noted previously, format 214 can allow meta machine data 212 to become a foundation and basis for improved machine data pipeline architecture and design, improved data quality and metrics, improved DevOps pipeline development process and methodology, improved privacy review/approval processes and controls including software compliance, improved documentation, improved DevOps and testing automation, improved security such as IP security, access control, or cyber security, improved insight generation and machine data flow controls, and so on.

Meta machine data 212 structured according to format 214 can also provide additional transparency into an organization's data. Thus, business users can readily define, measure, and track any suitable changes to various data assets. Moreover, the combination of high-quality machine data and high quality associated meta machine data can enable applications that consume those data to be more intelligent.

Referring now to FIG. 5, an example schematic block diagram is depicted illustrating a system 500 that can leverage meta machine data 212 for the generation of artifacts and telemetry bundles in accordance with certain embodiments of this disclosure. In some embodiments, system 500 can be integrated into DevOps pipeline 502 or be communicatively coupled to DevOps pipeline 502.

Generally, a DevOps pipeline is an automated workflow that enables the continuous integration, delivery, and deployment of software applications. A DevOps pipeline can consist of a series of interconnected steps or stages that automate the process of building, testing, and deploying code changes, allowing developers to release new features or updates rapidly and reliably.

A typical DevOps pipeline, broken down into various key stages, such as code development in which developers write and commit code changes to a version control system. This stage marks the beginning of the pipeline, where new features or bug fixes are introduced. Another stage can be continuous integration (CI). In this stage, the CI server automatically pulls the latest code changes from the version control system and triggers a series of automated tests. These tests can include unit tests, integration tests, and code quality checks to ensure that the code changes meet quality standards and do not introduce regressions.

Another stage can be the build stage. Once the code passes all tests, it can be compiled or packaged into deployable artifacts, such as executable binaries, container images, or deployment packages. The build process may involve compiling source code, resolving dependencies, and generating artifacts suitable for deployment.

Another stage can be automated testing. After the build stage, the pipeline can execute additional automated tests to validate the functionality, performance, and security of the application. This may include functional tests, performance tests, security scans, and other types of tests tailored to the specific requirements of the application.

Another stage can include deployment. Once the code changes have been successfully built and tested, those code changes can be deployed to a staging or pre-production environment for further validation. This stage involves deploying the artifacts to the target environment, configuring infrastructure resources, and setting up the runtime environment necessary to run the application.

Another stage of a DevOps pipeline can be user acceptance test (UAT). In this stage, stakeholders or end users can perform acceptance testing on the deployed changes to validate that they meet business requirements and user expectations. Feedback from UAT may inform additional iterations or adjustments before proceeding to production deployment.

Another stage can be a release to production stage. After the changes have been validated in the staging environment, they can be promoted to production for final deployment. This stage involves deploying the artifacts to the production environment, updating DNS records, and performing any necessary configuration changes to make the changes live to end users.

Another stage can be a monitoring and feedback stage. Once the changes are deployed to production, the DevOps pipeline can continue to monitor the application's performance, availability, and health in real-time. Feedback from monitoring tools and user feedback loops informs future iterations and improvements to the application.

Overall, a DevOps pipeline can streamline the software delivery process by automating manual tasks, reducing cycle times, and increasing collaboration between development, operations, and quality assurance teams. Hence, DevOps pipeline 502 can operate to enable organizations to release high-quality software faster, more frequently, and with greater confidence.

Hence, DevOps pipeline 502 can receive input 504 in order to build an application. Input 504 can include source code or other design documents 506 that can be provided by an app developer or another suitable entity. Input data 504 can further include meta machine data 212, which can be received from metadata repository 220. As will become more apparent from the discussion below, system 500 can be readily integrated into DevOps pipeline 502 to provide additional enhancements based on meta machine data 212 or other input data 504. Thus, all or a portion of input data 504 that is received by DevOps pipeline 502 can be available to system 500.

System 500 can comprise artifact generation component 110, telemetry component 112, or other suitable components. System 500 can comprise or be coupled to chatbot 515, which can have access to associated AI models. Chatbot 515 can be similar in function to chatbot 215 detailed in connection with FIG. 2. However, chatbot 515 can have access to a different set of AI models and/or models that are trained differently than for chatbot 215.

Artifact generation component 110 can be configured to generate a group of artifacts 510 based on the meta machine data 212. This group of artifacts 510 can in some embodiments be similar to the artifacts generated by DevOps pipeline 502 as detailed above with respect to the build stage of DevOps pipeline 502. Typically, an artifact of the group of artifacts 510 can be any suitable document or file, a portion of code, a configuration that is used by a DevOps pipeline 502 or a data pipeline, or another suitable element, examples of which are provided with reference to FIG. 6A.

FIG. 6A is an example schematic block diagram 600A illustrating various examples of the group of artifacts 510 in accordance with certain embodiments of this disclosure. As an initial example, an artifact can be indicative of pipeline configuration 602. Pipeline configuration 602 can be specific to a DevOps pipeline, a machine data pipeline, or another suitable pipeline. In some embodiments, pipeline configuration 602 can comprise configuration 408 detailed in connection with FIG. 4.

In some embodiments, group of artifacts 510 can include pipeline code 604. Pipeline code 604 can be specific to a DevOps pipeline, a machine data pipeline, or another suitable pipeline. In some embodiments, pipeline code 604 can comprise code 410 detailed in connection with FIG. 4. In some embodiments, group of artifacts 510 can include testcases 606. In some embodiments, testcases 606 can comprise testcases 404 detailed in connection with FIG. 4.

In some embodiments, group of artifacts 510 can include security document 608. These can include, for instance, PIA documents, SRA documents, or other suitable documents. In some embodiments, security document 608 can comprise privacy and security element 406 detailed in connection with FIG. 4.

In some embodiments, group of artifacts 510 can include schemas 610. In some embodiments, schemas 610 can comprise schema 402 detailed in connection with FIG. 4. In some embodiments, group of artifacts 510 can include SLA documents 612. In some embodiments, SLA documents 610 can comprise SLA elements 412 detailed in connection with FIG. 4. Other examples of group of artifacts 510 can exist. For example, such can also include executable or other binaries, which potentially can be generated in conjunction with DevOps pipeline 502.

Still referring to FIG. 5, system 500 can further comprise telemetry component 112. Telemetry component 112 can be configured to generate telemetry bundle 520. As noted, either or both the group of artifacts 510 generated by artifact generation component 110 or telemetry bundle 520 generated by telemetry component 112 can leverage chatbot 515 as well meta machine data 212 stored in metadata repository 220.

Telemetry bundle 520 can represent a defined collection of selected members of group of artifacts 510. In other words, different telemetry bundles 520 can be comprised of different subsets of the group of artifacts 510. FIG. 6B, which can be considered in conjunction with FIG. 5, is an example schematic block diagram 600B illustrating various examples of the structure or function of a given telemetry bundle 520 in accordance with certain embodiments of this disclosure.

For example, a given telemetry bundle 520 can comprise binaries 620. Binaries 620 can be executable binaries or other suitable binaries that are packaged into telemetry bundle 620, which can include, e.g., plugins, utilities, business logic, and so forth. The same or a different telemetry bundle 520 can comprise pipeline configurations 622. Pipeline configurations 622 can represent one or more of pipeline configuration 602 artifact. Such can be applicable to a machine data pipeline, a DevOps pipeline, or another suitable pipeline. As another example, illustrated at reference numeral 624, a telemetry bundle 520 can comprise meta machine data 212 that is applicable to a specific target (e.g., a specific domain entity 224), or another suitable collection of artifacts or other elements.

Hence, when a given product (e.g., application) is built via DevOps pipeline 502, meta machine data 212 can be accessed for a given product configuration. From meta machine data 212 a schema registry and a data models store can be populated. An associated data catalog can be queried or explored by interested parties such as application developers. Furthermore, telemetry bundles 520 can be generated for different portions of a machine data pipeline, which is further detailed in connection with FIG. 7.

Referring now to FIG. 7, an example schematic block diagram 700 is depicted illustrating additional aspects or elements of system 500 that can generate the telemetry bundle 520 in accordance with certain embodiments of this disclosure. For example, system 500 and more specifically telemetry component 112 can be further configured to transmit telemetry bundle 520 to a configurable device. In some embodiments, the configurable device can be configured by telemetry bundle 520, as further explained below.

The configurable device can be any suitable domain entity 224 or other suitable device or machine. Moreover, each telemetry bundle 520 can be specifically constructed for a given configurable device. By way of illustration, machine data pipeline 702 can operate to transfer data (e.g., machine data) from configurable devices to a data warehouse or backoffice, where the machine data can be stored and examined.

More generally, a data pipeline (e.g., machine data pipeline 702) can represent a series of interconnected processes or stages that enable the automated and efficient flow of data from source to destination. The flow of data typically involves various transformations and operations along the way. Data pipelines are commonly used in data engineering to ingest, process, transform, and analyze large volumes of data from diverse sources in a scalable and reliable manner.

As illustrated, system 500 can transmit a telemetry bundle 520 to various configurable devices associated with machine data pipeline 702. Such can include endpoint devices 704, edge devices 706, data warehouse devices 706 or another suitable device. Thus, telemetry component 112 can transmit different types of telemetry bundle 520 to different configurable devices of machine data pipeline 702.

For example, as shown, device bundle 710 can be transmitted to endpoint devices 704, which typically represent a primary set of configurable devices that generate the machine data. Device bundle 710 can represent a telemetry bundle 520 that is generated for configuration of endpoint devices 704 or a given product. Such can include business logic for enabling endpoint device 704 data components or functions.

Likewise, edge bundle 712 can be transmitted to edge devices 706, which typically represent devices that perform machine data pipeline operations such as transforming the machine data to a desired format. Edge bundle 712 can represent a telemetry bundle 520 that is generated for configuration of edge devices 706 or a given product. Such can include business logic for enabling edge device 706 data components or functions.

Additionally, warehouse bundle 714 can be transmitted to data warehouse devices 708, where the machine data is stored and where the machine data can be queried or explored by requesting applications, users, or otherwise. Warehouse bundle 714 can represent a telemetry bundle 520 that is generated for configuration of warehouse devices 708 or a given product. Such can include business logic for enabling backoffice warehouse device 708 data components or functions such as functionality with respect to machine data pipeline 702.

Telemetry foundation components can be deployed as platform components with platform installation. Telemetry foundation component can be composed of functional blocks/elements that can be turned on or off with configuration.

Hence, a given configurable device can comprise telemetry agent 716. For example, endpoint devices 704 and edge devices 706 can comprise telemetry agent 716. Telemetry agent 716 can control many operations of an associated device and/or certain operations involving machine data pipeline 702. Machine data flow can be directed to telemetry server 718 of warehouse devices 708.

A given telemetry bundle 520 can be received by a target device (e.g., endpoint devices 704, edge devices 706, warehouse devices 708) and can be configured accordingly. For example, a given telemetry element can be configured for a given function. Functionality of the element can be enabled for a given topic 222, which can be determined by the configuration, plugins, or the like received from telemetry bundle 520 or otherwise, or may be determined directly by meta machine data 212 itself.

Behavior of telemetry agent 716 can be a function of meta machine data 212, providing meta machine data-driven access controls on machine data. For example, the data metrics data structure 314 can enable protection of IP content within the machine data, protection of sensitive content within the machine data, or other protections. For instance, telemetry agent 716 can implement role-based access control (RBAC) procedures before allowing associated data (e.g., machine data or meta machine data 212). Further, protections can be provided on when the associated data is on a disk or in transit such as when shipping the machine data to telemetry server 718 and/or warehouse device 708.

Meta machine data-driven flow controls can also be facilitated by telemetry agent 716 and/or telemetry server 718. For example, the data quality metrics data structure 304, which can include SLA information, can be used to control how data is transferred and processed. In regard to transferring machine data, such can include information regarding buffering, priority, or transfer functions or protocols. With regard to how the machine data is processed, such can include compression, encryption, or the like.

Telemetry agent 716 can potentially handle machine data that is associated with a given topic 222 (e.g., temperature data) in a different manner than machine data associated with a different topic 222. Such can be based on an SLA, data quality, or data transfer priority configuration defined in meta machine data 212. It is appreciated that machine data can be optimized for transfer in this manner.

Meta machine data-drive compliance controls and customer contracts can further be facilitated by telemetry agent 716 and/or telemetry server 718. For example, the data metrics data structure 314 can define, e.g., the specific type of data (e.g., machine data) that can be transferred out of a given device based on contracts, the specific data that is to be de-identified or anonymized in order to comply with privacy regulation or policies, and so forth.

For instance, privacy classification can be reviewed and approved by privacy experts or other entities as part of a DevOps release process. Data elements in each topic can be anonymized or de-identified based on the privacy classification by telemetry agent 716. Data elements in each topic 222 can be filtered based on the contract by telemetry agent 716.

Meta machine data-drive exploration and validation can further be facilitated by telemetry agent 716 and/or telemetry server 718. For example, the data definitions data structure 312 can comprise schemas (e.g., schema 402 or schemas 610) or models that can facilitate exploration and discovery of data by application developers or other suitable entities. Validation of data can be performed so that stakeholders can be alerted. Thus, telemetry agent 716 can validate and tag machine data prior to transmitting to telemetry server 718, where that data can be explored or queried.

Meta machine data-drive documentation and governance can further be facilitated. For example, the various attributes of meta machine data 212 that is generated according to format 214 can facilitate generation of documentation such as SLAs, PIAs, validation test results, and other suitable documentation. In terms of governance, data quality metrics data structure 304 as well as data ownership attributes, data review and approval process and so on can be used to facilitate governance of the machine data.

Meta machine data-drive pipeline monitoring can further be facilitated. For example, the data quality metrics data structure 304 can allow monitoring of certain quality metrics such as data latency, data loss, and so on, as well as the status or health of various machine data pipeline 702 components or elements. Meta machine data 212 can further be leveraged to alert stakeholders defined therein upon detection of any privacy or security violations.

As can be observed, the techniques detailed herein can enable a scalable machine data pipeline 702 architecture that can be built using foundational components of meta machine data 212 that can be configurable. Such can further define data operations methodologies, e.g., where a shift-left strategy is enforced so meta machine data 212 can be defined for every data class or topic 222 at design time. Meta machine data lifecycle and access can thus be managed.

Meta machine data 212 can be utilized to generate the configurations, business logic, plugins, and so forth for machine data pipeline 702 or other suitable pipelines such as DevOps pipeline 502. Such can allow for configuration or ingestion of the desired behavior into pipeline components or elements.

The disclosed techniques can further provide a sustainable and scalable way for data governance, as data produced by any system grows. Current approaches of dealing with unstructured data with no or insufficient associated metadata are not pragmatic in terms of sustainability and scalability.

In some embodiments, all or a portion of system 200 and/or meta machine data generation component 108, or other portions of system 100, can be included in telemetry agent 716 or telemetry server 718.

Figure 8:
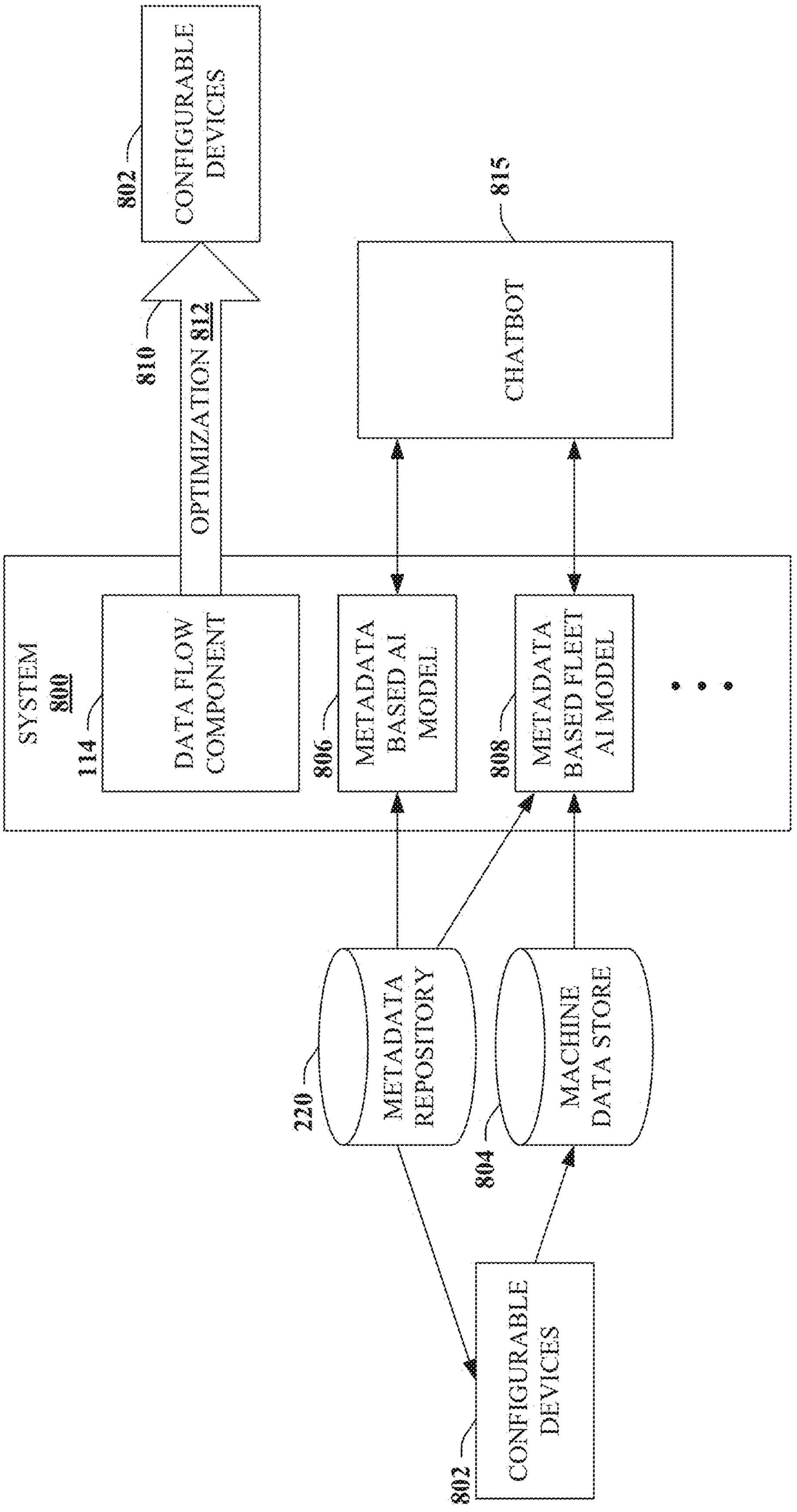
FIG. 8 depicts an example schematic block diagram illustrating a system that can leverage the meta machine data for optimizing or improving a data flow of the machine data in accordance with certain embodiments of this disclosure.

With reference now to FIG. 8, a schematic block diagram is depicted illustrating an example system 800 that can leverage the meta machine data for optimizing or improving a data flow of the machine data in accordance with certain embodiments of this disclosure.

For example, system 800 can comprise data flow component 114. Data flow component 114 can be configured to examine meta machine data 212 (e.g., stored in metadata repository 220) and a state of one or more configurable devices 802. In response, as indicated at reference numeral 810, data flow component 114 can determine optimization 812 for configurable device 802. Optimization 812 can be configured to modify the data flow of machine data being delivered to the backoffice or a data warehouse. Hence, optimization 812 can modify the data flow at some portion of machine data pipeline 702. Thus, in some embodiments, optimization 812 can be transmitted to configurable device 802 and the configuration of configurable device 802 can be modified accordingly.

Configurable devices 802 can be any suitable device. Such can include domain entities, endpoint devices 704, edge devices 706, warehouse devices 708, or the like. Machine data that is produced by certain ones of the configurable devices can be provided to machine data store 804.

System 800 can further include or be communicatively coupled to chatbot 815. Chatbot 815 can be similar in function to chatbot 215 detailed in connection with FIG. 2 and/or chatbot 515 detailed in connection with FIG. 5. However, chatbot 815 can have access to a different set of AI models and/or models that are trained differently than for chatbots 215, 515. For example, as illustrated, system 800 can comprise or be operatively coupled to metadata-based AI model 806, metadata-based fleet AI model 808, or another suitable model.

In some embodiments, metadata-based AI model 806 can be trained or configured to operate to assist data scientist, app developers, or another application development entity during the development of applications. For instance, via a suitable application programming interface (API), chatbot 815 can assist in exploration of metadata repository 220 that can store meta machine data 212. In order to provide additional context, consider the following example queries that can be made by an app developer entity.

An app developer can, e.g., query which topics (e.g., topics 222) related to a given subsystem (e.g., domain entity 224) are being generated. Another query may be directed to threshold values of a data element of a topic 222 for a given product configuration. Another query may be directed to protected health information (PHI) or personably identifiable information (PII) elements in the data being set to data warehouse devices 708. Another query may be directed to comparing two versions of a given schema 402, 610 for a given topic 222 of a given product configuration. Another query may be directed to a description of an error having a specified error code. Another query may request an IP classification or another classification of certain machine data. Still another query may request review or approval routes pending for a given topic 222.

In some embodiments, metadata-based fleet AI model 808 can be trained or configured to operate to provide fleet level insights, which can be used for report generation, flow optimization, or otherwise. For example, system 800 can leverage metadata-based fleet AI model 808. System 800 and/or metadata-based fleet AI model 808 can receive machine data from a fleet of systems (e.g., via machine data store 804) and topic-based meta machine data 212 from metadata repository 220 in order to determine optimization 812 that can optimize or improve data flows.

In some embodiments, meta machine data 212 configurations can be updated for the optimized or improved data flows to facilitate optimization 812. In some embodiments, the updated device configurations can be deployed to configurable devices 802 to facilitate optimization 812. Furthermore, via a suitable API, stakeholders can potentially explore, query, or monitor data flows or other suitable elements.

In some embodiments, such can facilitate generating data quality reports for data of a given topic 222 from a given product, which can be compared to fleet level metrics. In some embodiments, such can facilitate generating a report on the products within a given product family within a given region that are producing a certain type of error and identifying the root cause. In some embodiments, a report can be generated that indicates all products in which an error with specified error text has occurred in the past 30 days or another suitable period. In some embodiments, a report can be generated that indicates all topics 222 from all products in a specific region or having a specified classification that are sending invalid data. Other examples are contemplated, with the above serving as suitable examples to illustrate various different contexts.

As can be readily understood, the disclosed techniques can allow for rule-based data flows. As the amount of data (e.g., machine data) generated grows, it can become impractical to transfer all that data to back office/warehouse devices 708 and/or telemetry server 718. Therefore, it can be useful to control the flow of data such as changing data flows so that only certain data is sent to warehouse devices 708 by default. However, there may be occasions such as error/exception conditions in which sending more granular data can be useful to diagnose the problems. The proposed architecture lends itself to tuning the granularity and topics that are to be sent to warehouse devices 708 based when certain conditions can be detected on the device and in accordance with the configurations.

Furthermore, the disclosed techniques can allow for remote control of data flows. The granularity of machine data and data flows can be altered remotely from warehouse devices 708, for instance, by downloading appropriate configurations of certain data pipeline components on the device(s) when certain conditions are detected and/or when certain rules are satisfied. For example, when an error or exceptions condition is detected by a warehouse device 708, or when another condition or rule is satisfied.

The disclosed techniques can further allow for enforcement of changes to customer contracts. Similarly, the configurations of various pipeline components can be changed when customer contracts change. For example, certain data can be filtered out or not sent to warehouse devices 708 when the contract related to that data expires. Conversely, new data can be propagated via machine data pipeline 702 in response to a new contract or SLA occurring. As can be observed, collection of the right amount of data based on the context or conditions can be tailored and optimized, which can operate to reduce costs without impacting troubleshooting workflows. Such can further provide flexibility in applying customized data contracts based on region or based on varying demands of a global customer base.

Figure 9:
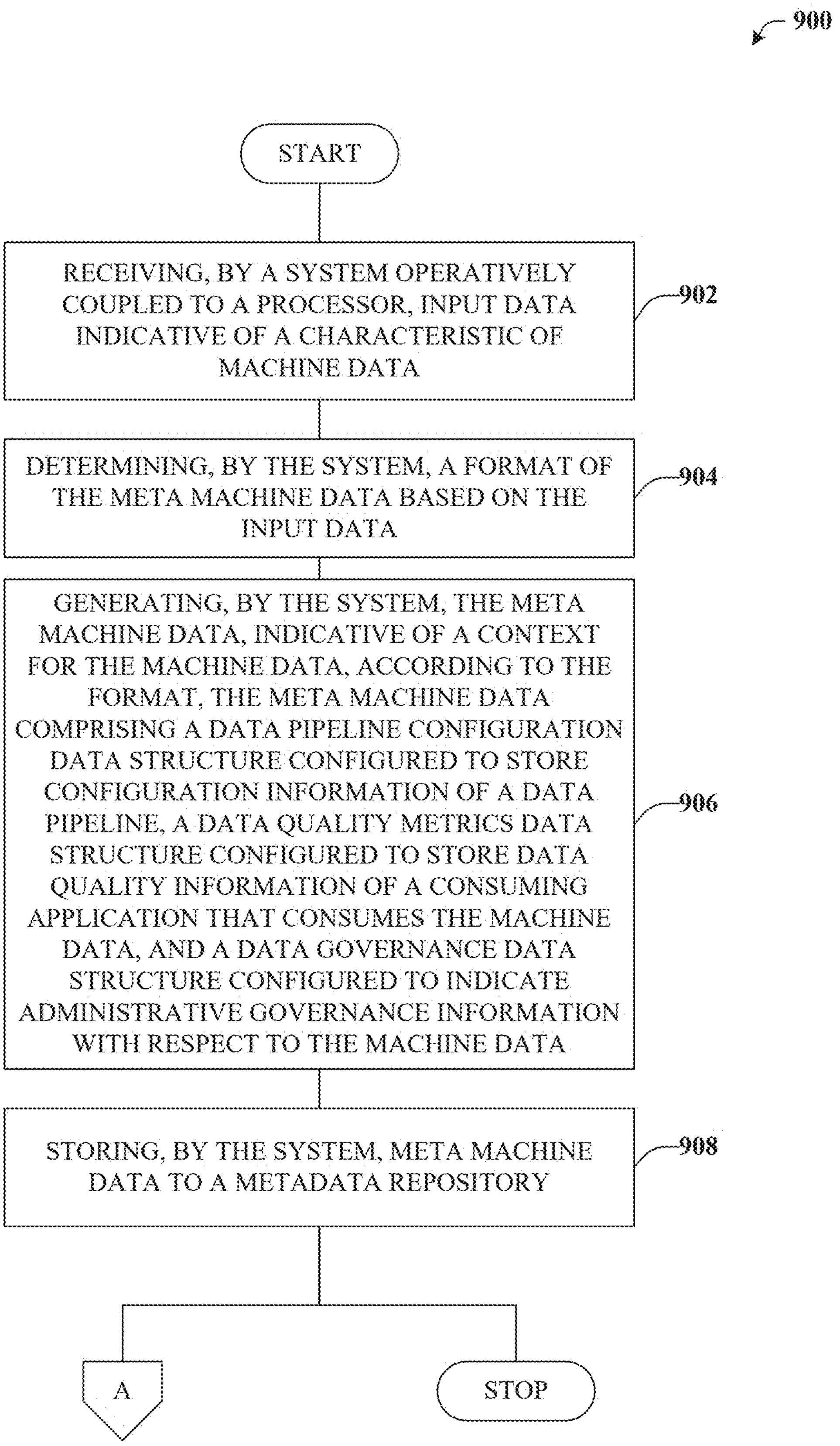
FIG. 9 depicts a flow diagram of an example method for defining and generating meta machine data enabling use of the meta machine data to control or improve pipeline operations in accordance with certain embodiments of this disclosure.
Figure 10:
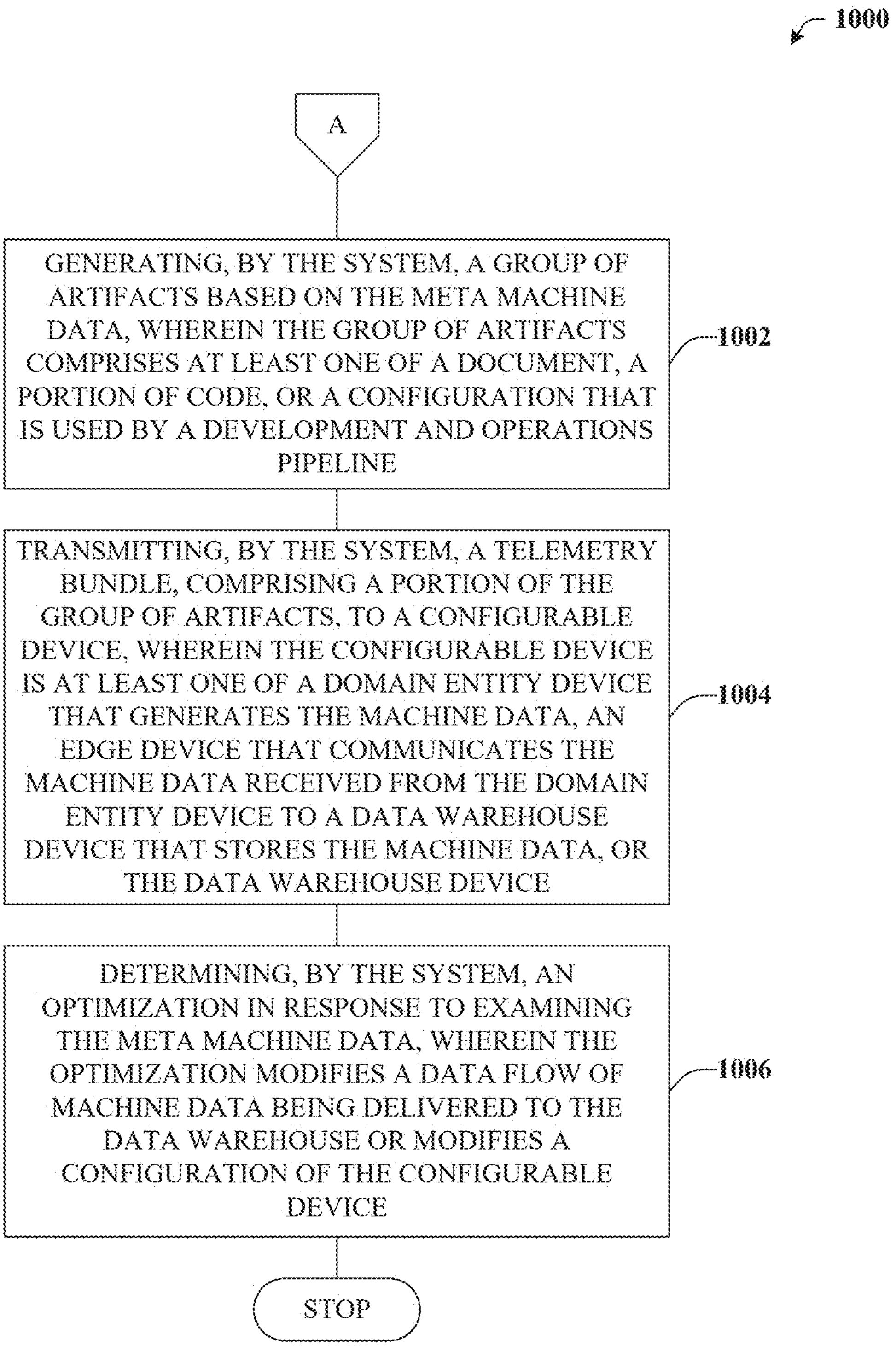
FIG. 10 depicts a flow diagram of an example method for providing additional aspect or elements in connection with defining, generating, or using meta machine data to control or improve pipeline operations in accordance with certain embodiments of this disclosure.

FIGS. 9 and 10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Referring to FIG. 9, there is illustrated a methodology 900 for defining and generating meta machine data enabling use of the meta machine data to control or improve pipeline operations in accordance with certain embodiments of this disclosure. For example, at reference numeral 902, a system operatively coupled to a processor can receive input data indicative of a characteristic of machine data. The characteristic can be determined from legacy documents such as PIA documents or SRA documents, or in other cases from modality input.

At reference numeral 904, the system can determine the format of the meta machine data. For example, the format can be determined based on the input data, which can include modality input or legacy documents such as existing PIA documents, SRA documents, data quality documents, or other suitable documents or inputs.

At reference numeral 906, the system can generate the meta machine data, which can be indicative of a context for the machine data. The meta machine data can be generated according to the format that was determined at reference numeral 904. For example, in accordance with the format, the meta machine data can comprise a data pipeline configuration data structure configured to store configuration information of a data pipeline, a data quality metrics data structure configured to store data quality information of a consuming application that consumes the machine data, and a data governance data structure configured to indicate administrative governance information with respect to the machine data.

At reference numeral 908, the system can store the meta machine data to a metadata repository. Method 900 can end or proceed to insert A, which is further detailed at FIG. 10.

Turning now to FIG. 10, there illustrated is a methodology 1000 for providing additional aspect or elements in connection with defining and generating meta machine data enabling use of the meta machine data to control or improve pipeline operations in accordance with certain embodiments of this disclosure. At reference numeral 1002, the system introduced in connection with FIG. 9 can generate a group of artifacts based on the meta machine data. The group of artifacts can comprise at least one of a document, a portion of code, or a configuration that is used by a development and operations pipeline or a data pipeline.

At reference numeral 1004, the system can transmit a telemetry bundle to a configurable device. This telemetry bundle can comprise a portion of the group of artifacts generated in connection with reference numeral 1002. The configurable device can be a domain entity device that generates the machine data, an edge device that communicates the machine data received from the domain entity device to a data warehouse device that stores the machine data, or the data warehouse device.

At reference numeral 1006, the system can determine an optimization in response to examining the meta machine data. In some embodiments, the optimization can modify a data flow of machine data being delivered to the data warehouse. In some embodiments, the optimization can modify a configuration of the configurable device.

For example, the optimization can be based on the ability to detect the data flows for a given topic/data class from one or more configurable devices. If the data flows go beyond upper or lower thresholds, then the priority of machine data from those particular devices can be adjusted appropriately so that the data flows are more efficiently handled. As another example, the optimization can be based on the ability to temporarily shut down the data flows selectively by topic or from a particular one or group of devices, e.g., when data for a given topic or from certain devices is flooding the data warehouse. Such could be responsive to hacking (e.g., and/or introduction of malicious code) certain machines that cause the flood of data going to the data warehouse.

As still another example, the optimization can relate to legitimate scenarios as well in which the volume of machine data being sent to the data warehouse increases. For instance, the increased volume can be the result of a new software update or patch or due to other demands of device or system usage. In those cases, new server instances can be spun up dynamically and configurations updated on the devices to send some portion of the machine data to the newly instantiated servers. Additionally, the same or similar process can be used to readjust priorities of certain data/topics based on observed trends.

Figure 11:
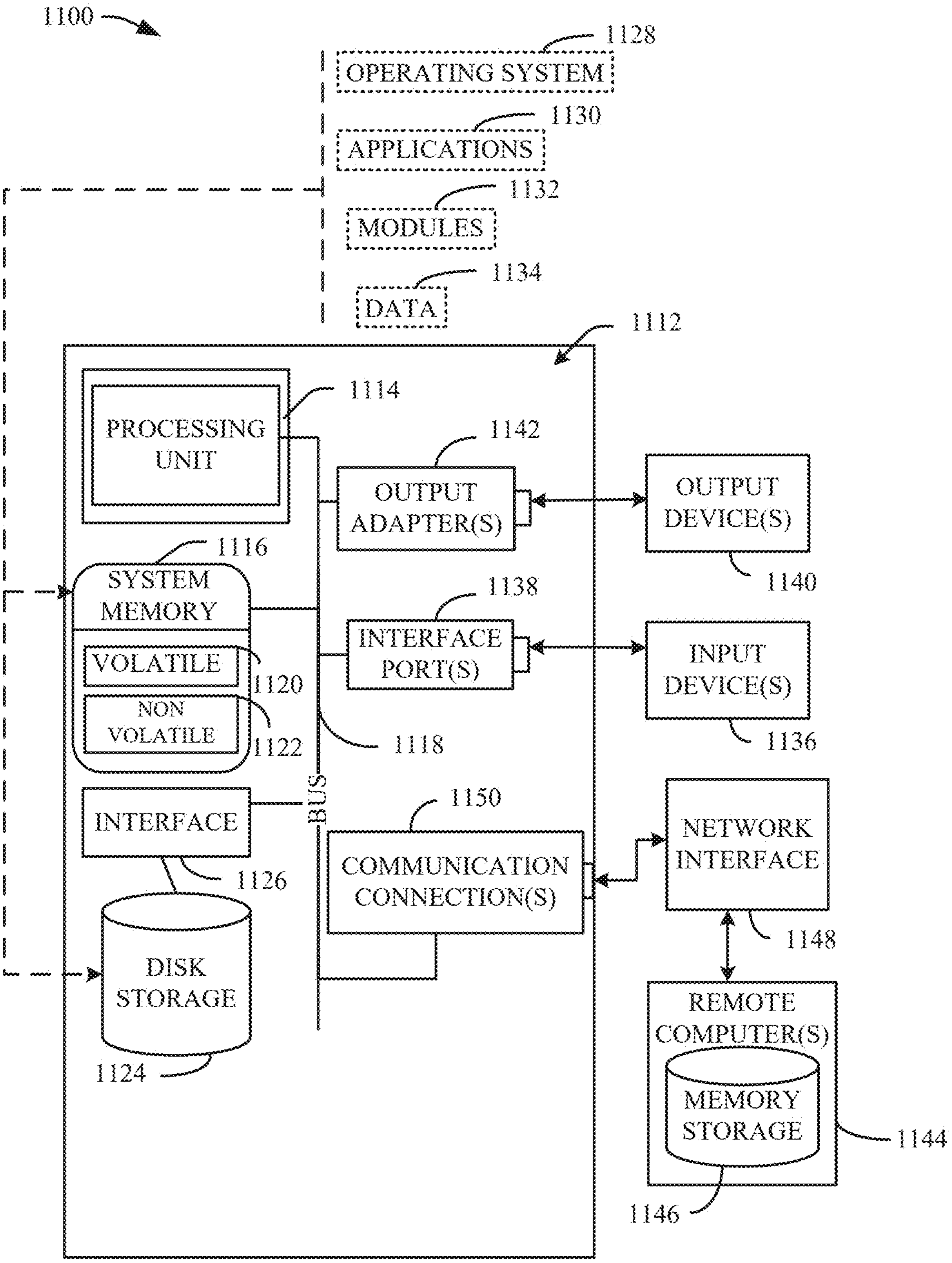
FIG. 11 is a schematic block diagram illustrating a suitable operating environment in accordance with certain embodiments of this disclosure.
Figure 12:
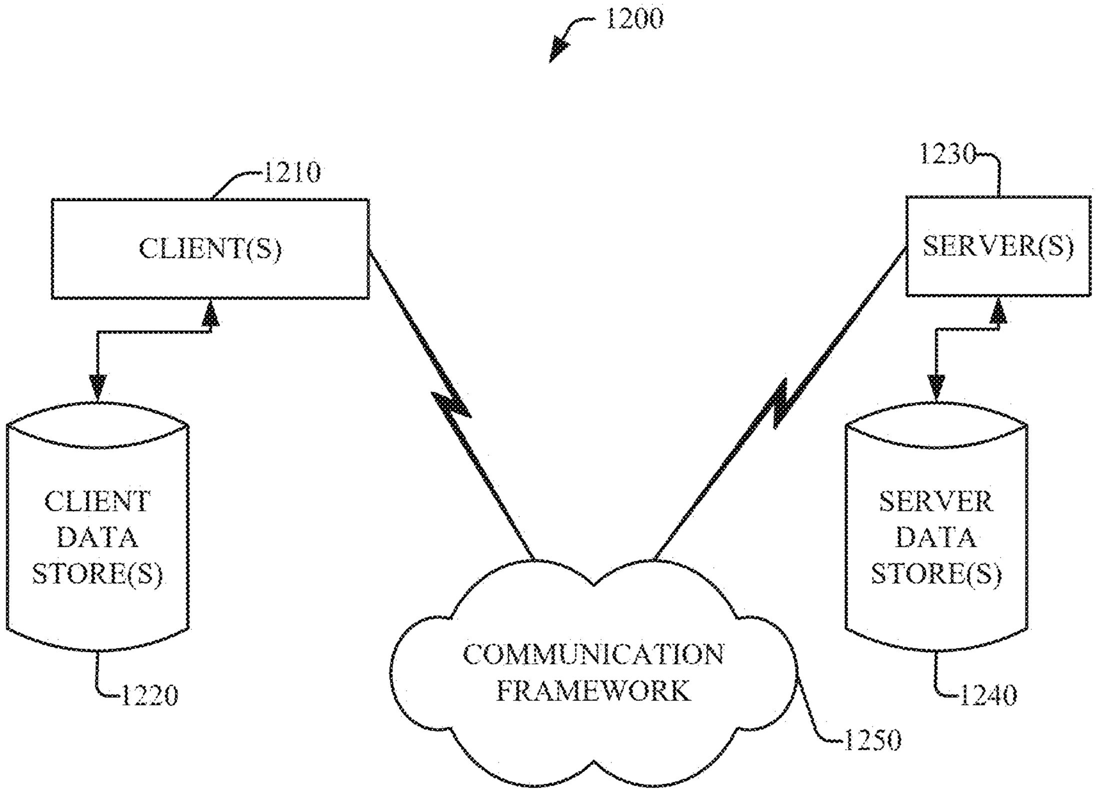
FIG. 12 is a schematic block diagram of a sample computer communication environment in accordance with certain embodiments of this disclosure.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/nonvolatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 uses some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor-based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection

1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well as non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:

a memory that stores computer executable components;

a processor that executes computer executable components stored in the memory, wherein the computer executable components comprise:

a meta machine data capture component that receives input data and stores, to a metadata repository, meta machine data indicative of a context for machine data; and a meta machine data generation component that generates the meta machine data according to a format that is determined based on the input data, wherein the meta machine data generation component uses a chatbot with access to an artificial intelligence model to at least one of: generate the meta machine data or determine a structure for the format according to the input data, and wherein the meta machine data generated by the meta machine data generation component comprises:

a data pipeline configuration data structure configured to store configuration information of a data pipeline that communicates the machine data;

a data quality metrics data structure configured to store data quality information of a consuming application that consumes the machine data; and a data governance data structure configured to indicate administrative governance information with respect to the machine data;

and a telemetry component configured to generate a telemetry bundle based on the meta machine data and to transmit the telemetry bundle to a configurable device, wherein the configurable device is at least one of a domain entity device that generates the machine data, an edge device that communicates the machine data, or a data warehouse device, wherein the telemetry bundle configures operation of the configurable device based on the meta machine data, wherein the meta machine data is stored to the metadata repository according to at least one of a machine data topic or a domain entity that generates the machine data, and wherein the meta machine data is grouped in the metadata repository based on the topic or the domain entity.

2. The system of claim 1, wherein the configuration information of the data pipeline comprises data pipeline input data that describes an input to the data pipeline, processing data that describes processing that the data pipeline performs, storage data that describes data that is stored by the data pipeline, and output data that describes an output of the data pipeline.

3. The system of claim 1, wherein the data quality information of the consuming application comprises app importance data that indicates a degree of importance of the machine data to the consuming application, volume data that indicates an amount or velocity of the machine data that is expected to be consumed by the consuming application, retention data that indicates a time to retain the machine data, loss data that indicates a data loss threshold for the machine data, and latency data that indicates a time from collection of the machine data until the machine data is ready for consumption by the consuming application.

4. The system of claim 1, wherein the administrative governance information comprises:

stakeholder information indicative of a data owner identifier of the machine data, a data steward identifier of the machine data, a privacy reviewer identifier of the machine data, or a notifier identifier of the machine data;

policy information indicative of a policy that is applicable to the machine data; and process information indicative of a process that is applicable to the machine data.

5. The system of claim 1, wherein the format generated by the meta machine data generation component further comprises a data context data structure configured to indicate a context of the machine data, wherein the context of the machine data comprises a name of a topic for the machine data, a type of the topic for the machine data, a description of the topic for the machine data, and a name or modality of a domain entity that generates the machine data.

6. The system of claim 1, wherein the format generated by the meta machine data generation component further comprises a data actors data structure configured to indicate provenance information of the machine data, wherein the provenance information comprises a producer identifier of the machine data, a consumer identifier of the machine data, and a domain entity identifier that identifies a domain entity that generates the machine data.

7. The system of claim 1, wherein the format generated by the meta machine data generation component further comprises a data definitions data structure configured to indicate structural information of the machine data and semantic information of the machine data, wherein the structural information indicates a schema utilized by the machine data or a data type associated with a data element of the machine data, and wherein the semantic information indicates a relationship between at least two different data elements of the machine data.

8. The system of claim 1, wherein the format generated by the meta machine data generation component further comprises a data metrics data structure configured to indicate a range of suitable values for the machine data and a privacy classification of the machine data.

9. The system of claim 1, wherein the computer executable components further comprise an artifact generation component that generates a group of artifacts based on the meta machine data, wherein the group of artifacts comprises at least one of a document, a portion of code, or a configuration that is used by a development and operations pipeline.

10. The system of claim 1, wherein the computer executable components further comprise a data flow component that, in response to examining the meta machine data and a state of the configurable device, determines an optimization that modifies a data flow of machine data being delivered to the data warehouse device.

11. The system of claim 10, wherein the optimization further modifies a configuration of the configurable device.

12. A method, comprising:

receiving, by a system operatively coupled to a processor, input data indicative of a characteristic of machine data;

determining, by the system, a format of the meta machine data based on the input data;

generating, by the system, the meta machine data, indicative of a context for the machine data, according to the format, wherein the meta machine data generation component uses a chatbot with access to an artificial intelligence model to at least one of: generate the meta machine data or determine a structure for the format according to the input data, and the meta machine data comprising a data pipeline configuration data structure configured to store configuration information of a data pipeline, a data quality metrics data structure configured to store data quality information of a consuming application that consumes the machine data, and a data governance data structure configured to indicate administrative governance information with respect to the machine data;

generating a telemetry bundle based on the meta machine data and transmitting the telemetry bundle to a configurable device, wherein the configurable device is at least one of a domain entity device that generates the machine data, an edge device that communicates the machine data, or a data warehouse device, wherein the telemetry bundle configures operation of the configurable device based on the meta machine data; and storing, by the system, meta machine data to a metadata repository according to at least one of a topic or a domain entity, wherein the meta machine data is grouped in the metadata repository based on the topic or the domain entity.

13. The method of claim 12, further comprising generating, by the system, a group of artifacts based on the meta machine data, wherein the group of artifacts comprises at least one of a document, a portion of code, or a configuration that is used by a development and operations pipeline.

14. The method of claim 12, further comprising determining, by the system, an optimization in response to examining the meta machine data, wherein the optimization modifies a data flow of machine data being delivered to the data warehouse device or modifies a configuration of the configurable device.

15. A non-transitory machine-readable storage medium, comprising executable instructions that, when executed by a processor, facilitate performance of operations, comprising:

receiving input data indicative of a characteristic of machine data;

determining a structure for meta machine data based on the input data, wherein the meta machine data is indicative of a context for the machine data;

generating the meta machine data according to the structure comprising a data pipeline configuration data structure configured to store configuration information of a data pipeline, a data quality metrics data structure configured to store data quality information of a consuming application that consumes the machine data, and a data governance data structure configured to indicate administrative governance information with respect to the machine data, wherein a chatbot, with access to an artificial intelligence model, is configured to at least one of: generate the meta machine data or determine a structure for the format according to the input;

generating a telemetry bundle based on the meta machine data and transmitting the telemetry bundle to a configurable device, wherein the configurable device is at least one of a domain entity device that generates the machine data, an edge device that communicates the machine data, or a data warehouse device, wherein the telemetry bundle configures operation of the configurable device based on the meta machine data; and storing the meta machine data to a metadata repository according to a topic or a domain entity, wherein the meta machine data is grouped in the metadata repository based on the topic or the domain entity.

16. The non-transitory machine-readable storage medium of claim 15, wherein the operations further comprise, packaging a group of artifacts, generated based on the machine data, into a telemetry bundle and transmitting the telemetry bundle to a configurable device.

17. The non-transitory machine-readable storage medium of claim 16, wherein the operations further comprise, in response to examining the meta machine data, determining an optimization that modifies a data flow of machine data being delivered to the data warehouse device.

* * * * *